(12) United States Patent
Ishimoto et al.

(10) Patent No.: US 9,188,359 B2
(45) Date of Patent: Nov. 17, 2015

(54) DRAINLESS AIR CONDITIONER

(75) Inventors: Shinji Ishimoto, Sakai (JP); Tadao Tsuji, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 213 days.

(21) Appl. No.: 13/145,156

(22) PCT Filed: Jan. 28, 2010

(86) PCT No.: PCT/JP2010/000508
§ 371 (c)(1),
(2), (4) Date: Jul. 19, 2011

(87) PCT Pub. No.: WO2010/087182
PCT Pub. Date: Aug. 5, 2010

(65) Prior Publication Data
US 2011/0271700 A1   Nov. 10, 2011

(30) Foreign Application Priority Data

Jan. 30, 2009 (JP) .................. 2009-020030

(51) Int. Cl.
*F24F 13/04* (2006.01)
*F24F 13/10* (2006.01)
(Continued)

(52) U.S. Cl.
CPC ............. *F24F 12/001* (2013.01); *F24F 3/1411* (2013.01); *F24F 3/1429* (2013.01); *F24F 12/003* (2013.01); *F24F 2012/007* (2013.01); *Y02B 30/52* (2013.01); *Y02B 30/563* (2013.01)

(58) Field of Classification Search
CPC ............. F24F 13/04; F24F 13/10; F24F 7/08; F24F 7/04; F24F 7/06; F24F 2007/001; F24F 2013/10; F24F 3/1423; F24F 2203/1084; F24F 2003/144; F24F 3/1417; F24F 13/075; F24F 1/0007; F24F 2001/0037; F25D 17/045; F25D 17/065; F25D 2400/04; F25D 17/047; F25D 17/042; F25D 3/04
USPC .................. 62/271, 238.3, 94, 408, 410–412
See application file for complete search history.

(56) References Cited

U.S. PATENT DOCUMENTS 4,608,961 A * 9/1986 Lanham et al. ............. 126/21 A
6,126,540 A * 10/2000 Janu et al. ..................... 454/229
(Continued)

FOREIGN PATENT DOCUMENTS

JP   6-221618 A    8/1994
JP   7-253225 A   10/1995
(Continued)

OTHER PUBLICATIONS
International Search Report of corresponding PCT Application No. PCT/JP2010/000508.
(Continued)

*Primary Examiner* — Frantz Jules
*Assistant Examiner* — Meraj A Shaikh
(74) *Attorney, Agent, or Firm* — Global IP Counselors

(57) ABSTRACT

A drainless air conditioner performs an air conditioning process on mixed air, which is a mixture of some indoor air and outdoor air. A first adsorptive heat exchanger and a second adsorptive heat exchanger are capable of performing a humidity conditioning process on the air. An air heat exchanger is capable of exchanging heat between the air and a fluid after it has undergone a heat treatment by a heat source. The outdoor air undergoes a humidity conditioning process by the first adsorptive heat exchanger or the second adsorptive heat exchanger and becomes the mixed together with some of the indoor air. The air heat exchanger exchanges heat between the mixed air and a fluid. Exhaust air undergoes the humidity conditioning process by the first adsorptive heat exchanger or the second adsorptive heat exchanger and is subsequently delivered to the outdoor space.

15 Claims, 11 Drawing Sheets

(51) Int. Cl.
*F24F 7/08* (2006.01)
*F24F 12/00* (2006.01)
*F24F 3/14* (2006.01)

(56) References Cited

U.S. PATENT DOCUMENTS

| | | | |
|---|---|---|---|
| 2005/0257551 A1* | 11/2005 | Landry | 62/271 |
| 2006/0168842 A1* | 8/2006 | Sprague | 34/396 |
| 2007/0039343 A1* | 2/2007 | Ikegami et al. | 62/271 |
| 2008/0014857 A1* | 1/2008 | Spadafora et al. | 454/229 |
| 2008/0076346 A1* | 3/2008 | Ahmed | 454/256 |
| 2008/0307814 A1* | 12/2008 | Matsui et al. | 62/238.3 |
| 2010/0218534 A1* | 9/2010 | Yabu et al. | 62/271 |
| 2010/0282455 A1* | 11/2010 | Maegawa et al. | 165/181 |

FOREIGN PATENT DOCUMENTS

| | | |
|---|---|---|
| JP | 2004-92956 A | 3/2004 |
| JP | 2005-114291 A | 4/2005 |
| JP | 2005-164220 A | 6/2005 |
| JP | 2005-291535 A | 10/2005 |
| JP | 2005-315430 A | 11/2005 |
| JP | 2007-232290 A | 9/2007 |
| JP | 2008-70060 A | 3/2008 |
| JP | 2008-145092 A | 6/2008 |

OTHER PUBLICATIONS

International Preliminary Report of corresponding PCT Application No. PCT/JP2009/000508.

* cited by examiner

CROSS SECTIONAL VIEW TAKEN ALONG THE II-II LINE IN FIG. 1

CROSS SECTIONAL VIEW TAKEN ALONG THE III-III LINE IN FIG. 1

DRAINLESS AIR CONDITIONER

CROSS-REFERENCE TO RELATED APPLICATIONS

This U.S. National stage application claims priority under 35 U.S.C. §119(a) to Japanese Patent Application No. 2009-020030, filed in Japan on Jan. 30, 2009, the entire contents of which are hereby incorporated herein by reference.

TECHNICAL FIELD

The present invention relates to a drainless air conditioner that air conditions indoor air while performing an air conditioning process on outdoor air.

BACKGROUND ART

A humidity conditioning process performing apparatus that performs an outdoor air humidity conditioning process is known in the conventional art, as disclosed in Japanese Laid-open Patent Application Publication No. 2008-145092. In the art disclosed in Japanese Laid-open Patent Application Publication No. 2008-145092, a refrigerant circuit is provided that comprises a compressor, two heat exchangers, and an expansion valve; furthermore, an adsorbing material, which can adsorb moisture from the air, is applied to the two heat exchangers. When one of the two heat exchangers functions as an evaporator, it functions as an adsorber that adsorbs moisture from the air; furthermore, when the other of the two heat exchangers functions as a condenser, it functions as a regenerator that restores the adsorbed moisture to the air. The present air conditioner supplies humidity conditioned air to the indoor space by performing the outdoor air humidity conditioning process, wherein the heat exchangers repetitively alternate between functioning as an adsorber and functioning as a regenerator.

SUMMARY

Technical Problem

For example, when an air conditioning process that includes a latent heat process and a sensible heat process is performed, heat exchangers, whereto the adsorbing material has been applied, can efficiently perform the outdoor air humidity conditioning process (i.e., the latent heat process), as recited in Japanese Laid-open Patent Application Publication No. 2008-145092; however, the air conditioner cannot perform the sensible heat process as a stand-alone unit. In addition, in an air conditioner configured as a vapor compression type refrigerant circuit, it is possible to perform the air conditioning process during cooling operation in the summer season when air conditioning process is performed; however, because condensed water is generated, equipment (e.g., a drain pan, a drain piping, and the like) that discharges the condensed water must be installed. Furthermore, during heating operation in the winter season, only the sensible heat process can be performed because a stand-alone air conditioner cannot perform humidification.

An object of the present invention is to provide an air conditioner that can perform both a latent heat process and a sensible heat process as a stand-alone unit, can reduce production and installation costs, and can achieve energy conservation.

Solution to Problem

A drainless air conditioner according to a first aspect of the invention is a drainless air conditioner that performs an air conditioning process on mixed air, which is a mixture of some indoor air and outdoor air, and comprises a main body casing, an outdoor air supplying unit, an indoor air supplying unit, an exhausting unit, a first adsorptive heat exchanger, a second adsorptive heat exchanger, and an air heat exchanger. The outdoor air supplying unit takes the outdoor air into the main body casing and delivers such to the indoor space. The indoor air supplying unit delivers to the indoor space, as return air, some of the indoor air taken into the main body casing. The exhausting unit delivers to the outdoor space, as exhaust air, the indoor air other than the return air that was taken into the main body casing. The first adsorptive heat exchanger has an adsorbing material that can adsorb and desorb moisture in air. In addition, the first adsorptive heat exchanger functions as an adsorber that adsorbs the moisture or as a regenerator that restores the adsorbed moisture to the air. In addition, the first adsorptive heat exchanger is capable of performing a humidity conditioning process on the air. The second adsorptive heat exchanger has an adsorbing material that can adsorb and desorb moisture in the air. In addition, the second adsorptive heat exchanger functions as an adsorber that adsorbs the moisture or as a regenerator that restores the adsorbed moisture to the air. In addition, the second adsorptive heat exchanger is capable of performing a humidity conditioning process on the air. The air heat exchanger is capable of exchanging heat between the air and a fluid after it has undergone a heat treatment by a heat source. The main body casing houses the first adsorptive heat exchanger, the second adsorptive heat exchanger, the air heat exchanger, the outdoor air supplying unit, the indoor air supplying unit, and the exhausting unit. The outdoor air undergoes a humidity conditioning process by the first adsorptive heat exchanger or the second adsorptive heat exchanger and becomes the mixed air, wherein some of the indoor air is mixed. The air heat exchanger exchanges heat between the mixed air and cold water or hot water. The exhaust air undergoes the humidity conditioning process by the first adsorptive heat exchanger or the second adsorptive heat exchanger and is subsequently delivered to the outdoor space. When the first adsorptive heat exchanger functions as an adsorber, the second adsorptive heat exchanger functions as a regenerator. When the first adsorptive heat exchanger functions as a regenerator, the second adsorptive heat exchanger functions as an adsorber.

In the present invention, the latent heat process and the sensible heat process are performed on the outdoor air and the sensible heat process is performed on the indoor air by virtue of the air heat exchanger exchanging heat between the mixed air, which is a mixture of the outdoor air after the humidity conditioning process has been performed and some of the indoor air, and the fluid, which has undergone a heat treatment by a heat source. For example, if cold water, as the fluid, is caused to flow through the air heat exchanger and the drainless air conditioner according to the present invention is made to perform cooling operation, then heat is exchanged between the cold water and the mixed air, which is a mixture of the some of the indoor air and the outdoor air after having undergone the humidity conditioning process (i.e., the latent heat process) in the air heat exchanger.

Thus, when the cooling operation is performed in the drainless air conditioner of the present invention, the heat is exchanged between the mixed air, which is a mixture of the dried outdoor air after it has undergone the latent heat process and the indoor air, and the cold water; consequently, in the air heat exchanger, while only the sensible heat process is performed the latent heat process is virtually not performed, which makes it possible to sufficiently cool the indoor space even if the temperature of the cold water that is caused to flow through the interior of the air heat exchanger is set to, for example, 15° C., which is a high temperature compared with that of the conventional temperature of 7° C. In addition, for the same reason, it is possible to prevent the generation of condensed water in the air heat exchanger. Accordingly, in the drainless air conditioner of the present invention, there is no need for a component, such as a drain pan or a drain piping, to process the condensed water. Thereby, costs incurred in the manufacture of the drainless air conditioner can be reduced; in addition, because the drain piping is also not needed during fabrication, fabrication-related costs can also be reduced.

A drainless air conditioner according to a second aspect of the invention is the drainless air conditioner according to the first aspect of the invention, wherein the air heat exchanger comprises a plurality of heat transfer pipes and a plurality of heat transfer fins. The plurality of heat transfer pipes, wherethrough the fluid flows, is arrayed in at least one row. The plurality of heat transfer fins is inserted through the plurality of heat transfer pipes. Furthermore, the air heat exchanger is disposed such that the directions in which the heat transfer pipes extend and the row directions in which the plurality of the heat transfer pipes is arrayed are oriented in the horizontal directions.

Generally, if air is cooled by an air heat exchanger (particularly in the summer season), condensed water tends to be generated and, therefore, in order make it easy to process this condensed water, the air heat exchanger is often disposed such that the row directions in which the plurality of the heat transfer pipes is arrayed are either oriented in the vertical directions or intersect the horizontal directions.

In the present invention, the humidity conditioning process is performed on the outdoor air in advance such that condensed water tends not to be generated in the air heat exchanger, which makes it possible to dispose the air heat exchanger such that the directions in which the heat transfer pipes extend and the row directions in which the plurality of the heat transfer pipes is arrayed are oriented in the horizontal directions. Accordingly, there is no limit to how the air heat exchanger can be arranged, which makes it easy to design the product compactly compared with the case wherein the degrees of freedom in the arrangement of the air heat exchanger are limited.

A drainless air conditioner according to a third aspect of the invention is the drainless air conditioner according to the first or second aspect of the invention, wherein the main body casing has an outdoor air introducing port, an indoor air introducing port, an exhaust port, and an air supply port. The outdoor air introducing port is capable of introducing the outdoor air. The indoor air introducing port is capable of introducing the indoor air. The exhaust port is capable of discharging the exhaust air to the outdoor space. The air supply port is capable of supplying the mixed air to the indoor space.

In the present invention, the main body casing has: the outdoor air introducing port, which can introduce the outdoor air; the indoor air introducing port, which can introduce the indoor air; the exhaust port, which can discharge the exhaust air to the outdoor space; and the air supply port, which can supply the air conditioned mixed air to the indoor space. The outdoor air introducing port and the exhaust port bring the interior of the main body casing and the outdoor space into communication with one another. Furthermore, the indoor air introducing port and the air supply port bring the interior of the main body casing and the indoor space into communication with one another.

Thus, providing the four openings to the main body casing makes it possible for the four openings to exclusively distribute the four types of air currents, namely, the outdoor air OA, the indoor air RA, the exhaust air EA, and the supply air SA (i.e., the air conditioned mixed air). Accordingly, the indoor space can be ventilated smoothly.

A drainless air conditioner according to a fourth aspect of the invention is the drainless air conditioner according to the third aspect of the invention and further comprises an airflow splitting unit, a supply air fan, and a return air fan. The airflow splitting unit divides the indoor air such that the airflow of the return air and the airflow of the exhaust air are in a prescribed ratio. The supply air fan takes the return air and the outdoor air into the main body casing as the mixed air and, while doing so, supplies the mixed air, after the air heat exchanger has exchanged heat between the mixed air and the fluid, to the indoor space. The return air fan takes the indoor air into the main body casing and, while doing so, delivers the indoor air to the airflow splitting unit. In the outdoor air supplying unit, the supply air fan delivers the outdoor air from the main body casing to the indoor space after the outdoor air has been taken into the main body casing. In the indoor air supplying unit, the supply air fan delivers the return air to the indoor space after the return air fan has taken the indoor air into the main body casing. In the exhausting unit, the return air fan delivers the exhaust air to the outdoor space after the indoor air has been taken into the main body casing.

In the present invention, there are three air passageways inside the main body casing: the passageway of the outdoor air supplying unit that is for taking the outdoor air into the main body casing and then delivering such to the indoor space; the passageway that is for delivering the return air to the indoor space after the indoor air has been taken into the casing; and the passageway that is for delivering the exhaust air to the outdoor space after the indoor air has been taken into the main body casing. Furthermore, these three passageways are formed by the supply air fan, the return air fan, and the airflow splitting unit, respectively.

Thus, three air passageways are formed by the airflow splitting unit and the two fans, and not by three fans to form three air passageways. Consequently, in the present invention, the main body casing can be made more compact than the case wherein three fans are installed. In addition, in the present invention, production cost can be reduced more than the case wherein three fans are installed. Furthermore, in the present invention, energy consumption can be reduced more than in the case wherein three fans are installed.

A drainless air conditioner according to a fifth aspect of the invention is the drainless air conditioner according to the fourth aspect of the invention and further comprises an exhaust air airflow detecting unit, which is capable of detecting the airflow of the exhaust air. The airflow splitting unit makes an adjustment based on the detected airflow of the exhaust air and the rotational speed of the return air fan such that the ratio of the airflow of the return air to the airflow of the exhaust air is the prescribed ratio.

In the present invention, based on the airflow of the return air that was derived based on the fan rotational speed of the return air fan and the exhaust air airflow detected by the exhaust air airflow detecting unit, the airflow splitting unit makes an adjustment such that the ratio of the airflow of the return air to the airflow of the exhaust air is the prescribed ratio. Accordingly, the airflow of the return air and the airflow of the exhaust air can be adjusted accurately.

A drainless air conditioner according to a sixth aspect of the invention is the drainless air conditioner according to the fourth or fifth aspect of the invention, wherein the airflow splitting unit is an airflow adjusting damper.

Accordingly, in the present invention, the main body casing can be made more compact than the case wherein three fans are installed. In addition, in the present invention, the production cost can be reduced more than the case wherein three fans are installed. Furthermore, in the present invention, energy consumption can be reduced more than the case wherein three fans are installed.

A drainless air conditioner according to a seventh aspect of the invention is the drainless air conditioner according to the third aspect of the invention and further comprises a supply air fan, a return air fan, and an exhaust fan. The supply air fan functions as the outdoor air supplying unit by delivering the outdoor air to the indoor space after the outdoor air has been taken into the main body casing. The return air fan functions as the indoor air supplying unit by delivering the return air to the indoor space after the return air has been taken into the main body casing. The exhaust fan functions as the exhausting unit by delivering the indoor air other than the return air to the outdoor space after the indoor air other than the return air has been taken into the main body casing. The airflow ratio of the return air to the exhaust air is set to the prescribed ratio by adjusting the airflow of the return air fan and the airflow of the exhaust fan.

In the present invention, there are three air passageways inside the main body casing: the passageway of the outdoor air supplying unit that takes the outdoor air into the main body casing and subsequently delivers the outdoor air to the indoor space; the passageway that delivers the return air to the indoor space after the indoor air has been taken into the main body casing; and the passageway that delivers the exhaust air to the outdoor space after the indoor air has been taken into the main body casing. Furthermore, the supply air fan, the return air fan, and the exhaust fan form these three passageways.

Thus, mounting a fan for each of the three passageways makes it possible to stably form the three passageways.

A drainless air conditioner according to an eighth aspect of the invention is the drainless air conditioner according to any one aspect of the first through seventh aspects of the invention and further comprises a compressor and an expansion mechanism. The compressor compresses a refrigerant. The expansion mechanism reduces the pressure of the refrigerant that was condensed by the first adsorptive heat exchanger or the second adsorptive heat exchanger. The compressor, the first adsorptive heat exchanger, the expansion mechanism, and the second adsorptive heat exchanger form a refrigerant circuit, which performs a vapor compression type cycle. The first adsorptive heat exchanger or the second adsorptive heat exchanger functions as an evaporator and also functions as the adsorber. The first adsorptive heat exchanger or the second adsorptive heat exchanger functions as a condenser and also functions as the regenerator.

Thus, because the first adsorptive heat exchanger and the second adsorptive heat exchanger, together with the compressor and the expansion mechanism, form the refrigerant circuit, they can effectively function as an adsorber or a regenerator.

A drainless air conditioner according to a ninth aspect of the invention is the drainless air conditioner according to the eighth aspect of the invention, wherein the refrigerant circuit further comprises a switching mechanism. The switching mechanism is capable of switching between a first state and a second state. In the first state, the first adsorptive heat exchanger is made to function as an evaporator and the second adsorptive heat exchanger is made to function as a condenser. In the second state, the first adsorptive heat exchanger is made to function as a condenser and the second adsorptive heat exchanger is made to function as an evaporator. The switching mechanism periodically switches between the first state and the second state.

Thus, because the first adsorptive heat exchanger and the second adsorptive heat exchanger can alternately function as an adsorber or a regenerator by the switching of the switching mechanism, they can perform dehumidifying operation as well as humidifying operation effectively.

Advantageous Effects of Invention

In the drainless air conditioner according to the first aspect of the invention, when the cooling operation is performed in the drainless air conditioner of the present invention, the heat is exchanged between the mixed air, which is a mixture of the dried outdoor air after it has undergone the latent heat process and the indoor air, and the cold water; consequently, in the air heat exchanger, while only the sensible heat process is performed the latent heat process is virtually not performed, which makes it possible to sufficiently cool the indoor space even if the temperature of the cold water that is caused to flow through the interior of the air heat exchanger is set to, for example, 15° C., which is a high temperature compared with that of the conventional temperature of 7° C. In addition, for the same reason, it is possible to prevent the generation of condensed water in the air heat exchanger. Accordingly, in the drainless air conditioner of the present invention, there is no need for a component, such as a drain pan or a drain piping, to process the condensed water. Thereby, costs incurred in the manufacture of the drainless air conditioner can be reduced; in addition, because the drain piping is also not needed during fabrication, fabrication-related costs can also be reduced.

In the drainless air conditioner according to the second aspect of the invention, the humidity conditioning process is performed on the outdoor air in advance such that condensed water tends not to be generated in the air heat exchanger, which makes it possible to dispose the air heat exchanger such that the directions in which the heat transfer pipes extend and the row directions in which the plurality of the heat transfer pipes is arrayed are oriented in the horizontal directions. Accordingly, it is possible to remove any limits on how the air heat exchanger can be arranged, which makes it easy to design the product compactly compared with the case wherein the degrees of freedom in the arrangement of the air heat exchanger are limited.

In the drainless air conditioner according to the third aspect of the invention, providing the four openings to the main body casing makes it possible for the four openings to exclusively distribute the four types of air currents, namely, the outdoor air OA, the indoor air RA, the exhaust air EA, and the supply air SA (i.e., the air conditioned mixed air). Accordingly, the indoor space can be ventilated smoothly.

In the drainless air conditioner according to the fourth aspect of the invention, three air passageways are formed by the airflow splitting unit and the two fans, and not by three fans to form three air passageways. Consequently, in the present invention, the main body casing can be made more compact than the case wherein three fans are installed. In addition, in the present invention, production cost can be reduced more than the case wherein three fans are installed. Furthermore, in the present invention, energy consumption can be reduced more than in the case wherein three fans are installed.

In the drainless air conditioner according to the fifth aspect of the invention, based on the airflow of the return air that was derived based on the fan rotational speed of the return fan and the exhaust air airflow detected by the exhaust air airflow detecting unit, the airflow splitting unit make an adjustment such that the ratio of the airflow of the return air to the airflow of the exhaust air is the prescribed ratio. Accordingly, the airflow of the return air and the airflow of the exhaust air can be adjusted accurately.

In the drainless air conditioner according to the sixth aspect of the invention, the main body casing can be made more compact than the case wherein three fans are installed. In addition, in the present invention, the production cost can be reduced more than the case wherein three fans are installed. Furthermore, in the present invention, energy consumption can be reduced more than the case wherein three fans are installed.

In the drainless air conditioner according to the seventh aspect of the invention, mounting a fan for each of the three passageways makes it possible to stably form the three passageways.

In the drainless air conditioner according to the eighth aspect of the invention, because the first adsorptive heat exchanger and the second adsorptive heat exchanger, together with the compressor and the expansion mechanism, form the refrigerant circuit, they can effectively function as an adsorber or a regenerator.

In the drainless air conditioner according to the ninth aspect of the invention, because the first adsorptive heat exchanger and the second adsorptive heat exchanger can alternately function as an adsorber or a regenerator by the switching of the switching mechanism, they can perform dehumidifying operation as well as humidifying operation effectively.

DESCRIPTION OF EMBODIMENTS

The embodiments of the present invention will now be explained in detail, referencing the drawings.

First Embodiment

An embodiment of the present invention will now be explained. An air conditioner 10 of the present embodiment performs a sensible heat process and a latent heat process on indoor air RA in order to air condition an indoor space and interchanges outdoor air OA and the indoor air RA (i.e., performs ventilation). Furthermore, the air conditioner 10 adjusts the humidity and the temperature of the intake outdoor air OA and supplies such to the indoor space while simultaneously discharging to the outdoor space some of the indoor air RA (i.e., return air RA1) that was taken in.

<Overall Configuration of the Air Conditioner>

Figure 1:
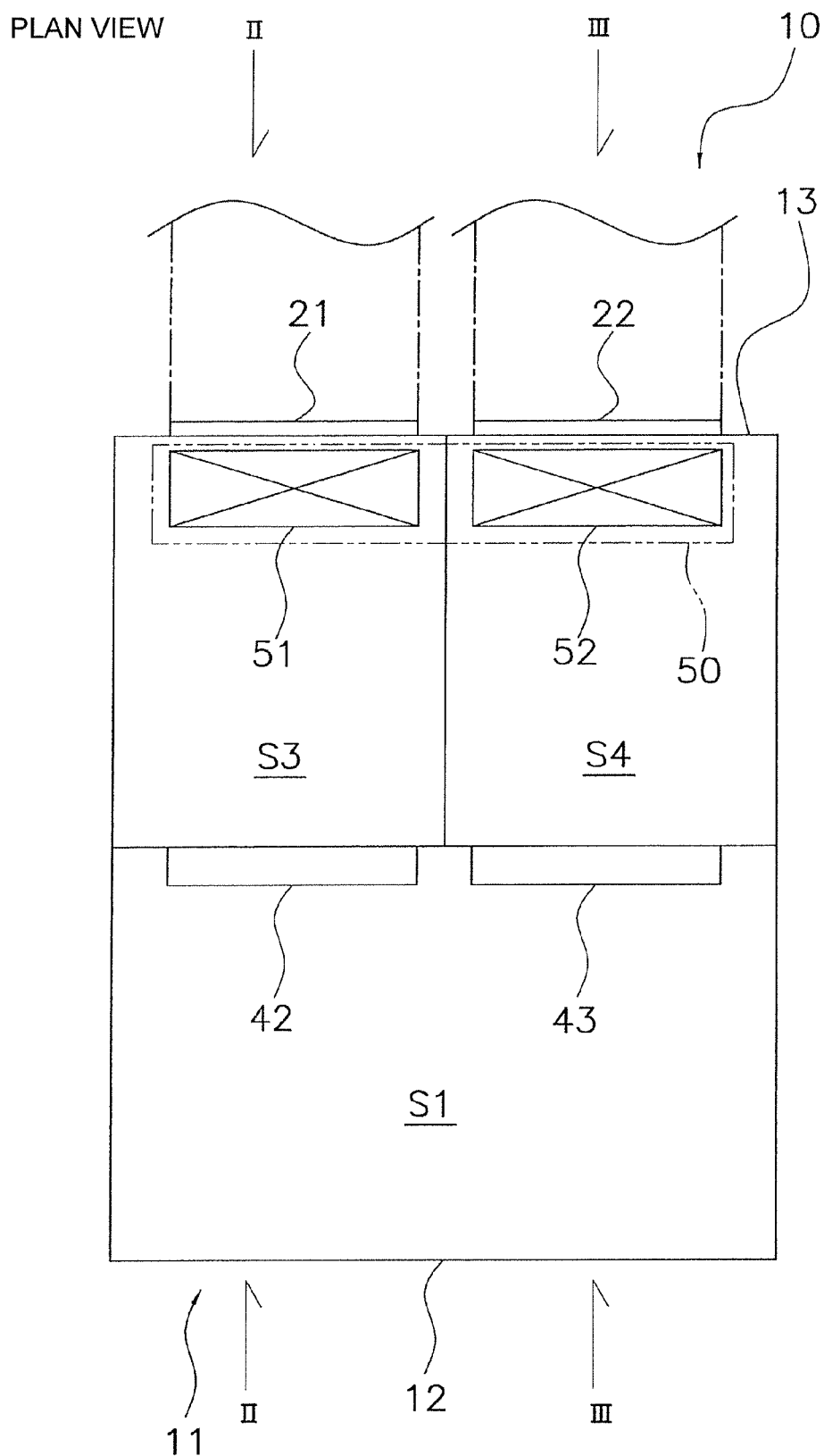
FIG. 1 is a lower side view (i.e., a plan view) of an air conditioner 10.
Figure 2:
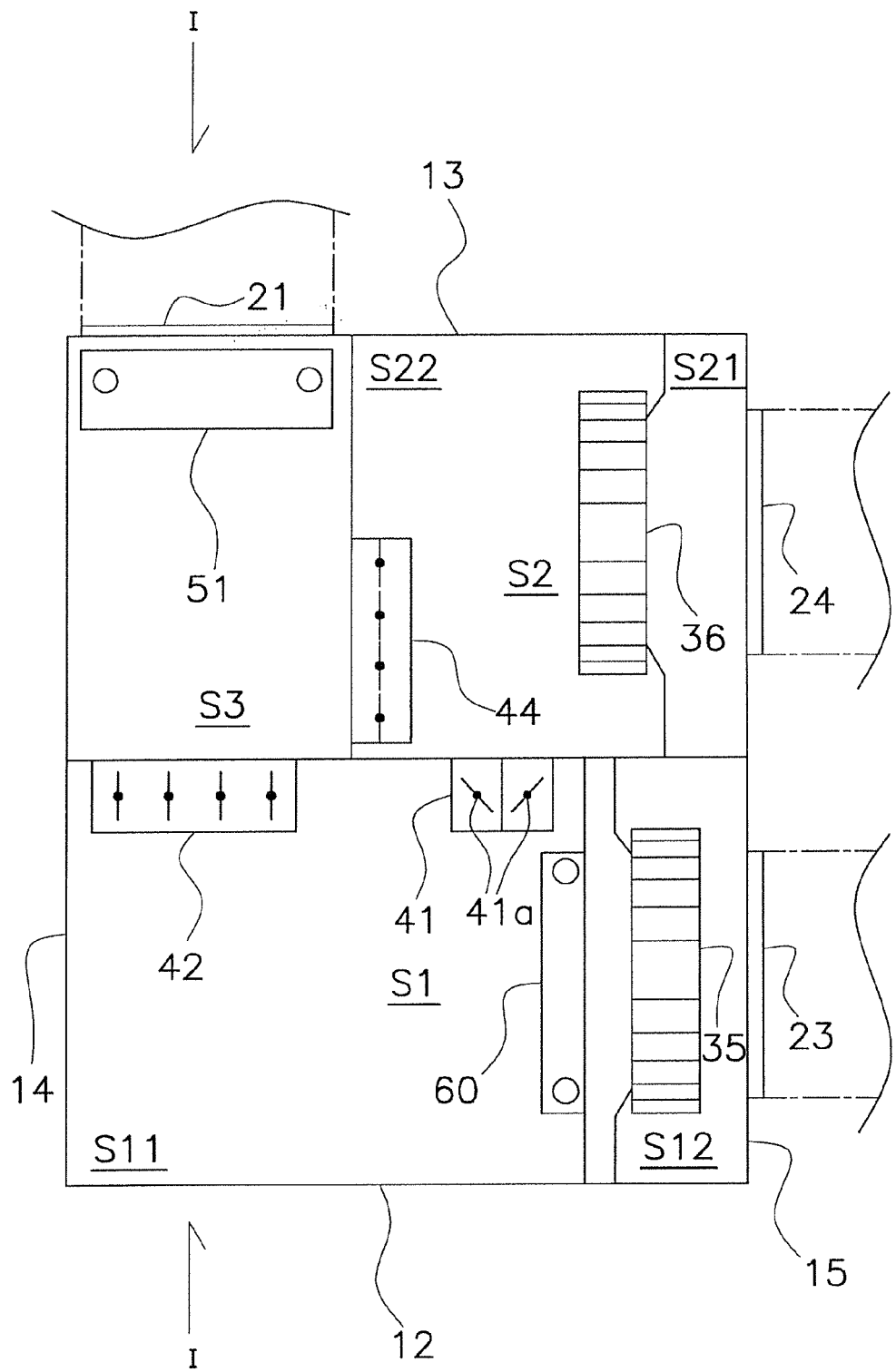
FIG. 2 is a left side cross sectional view of the air conditioner 10.
Figure 3:
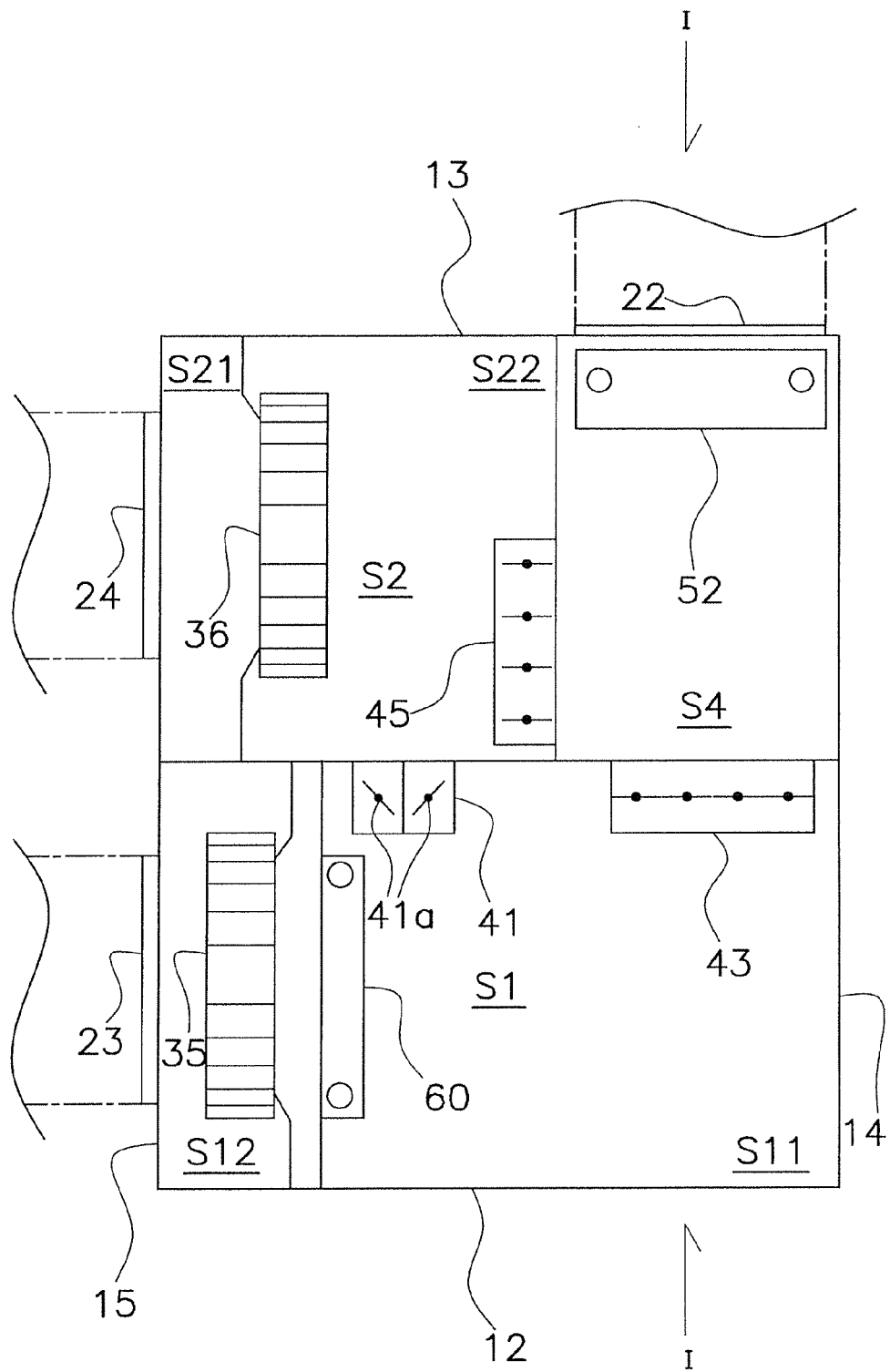
FIG. 3 is a right side cross sectional view of the air conditioner 10.

The air conditioner 10 will now be explained, referencing FIGS. 1-3. FIG. 1 is a lower side view (i.e., plan view) of the air conditioner 10. FIG. 2 is a left side cross sectional view of the air conditioner 10. FIG. 3 is a right side cross sectional view of the air conditioner 10. The lower side cross sectional view is a view wherein the lower sides of FIG. 2 and FIG. 3 are cut along a horizontal plane (i.e., a I-I cross sectional view). The left side cross sectional view is a view wherein the side to the left of the center in FIG. 1 is cut along a vertical plane (i.e., a II-II cross sectional view). The right side cross sectional view is a view wherein the side to the right of the center in FIG. 1 is cut along a vertical plane (i.e., a III-III cross sectional view). Furthermore, in FIG. 1, the lower side is the "front" and the upper side is the "rear"; based thereon, the left side is the "left" and the right side is the "right." In addition, in FIG. 2, the lower side is the "front," the upper side is the "rear," the left side is "down," and the right side is "up." In addition, in FIG. 3, the lower side is the "front," the upper side is the "rear," the left side is "up," and the right side is "down."

Figure 4:
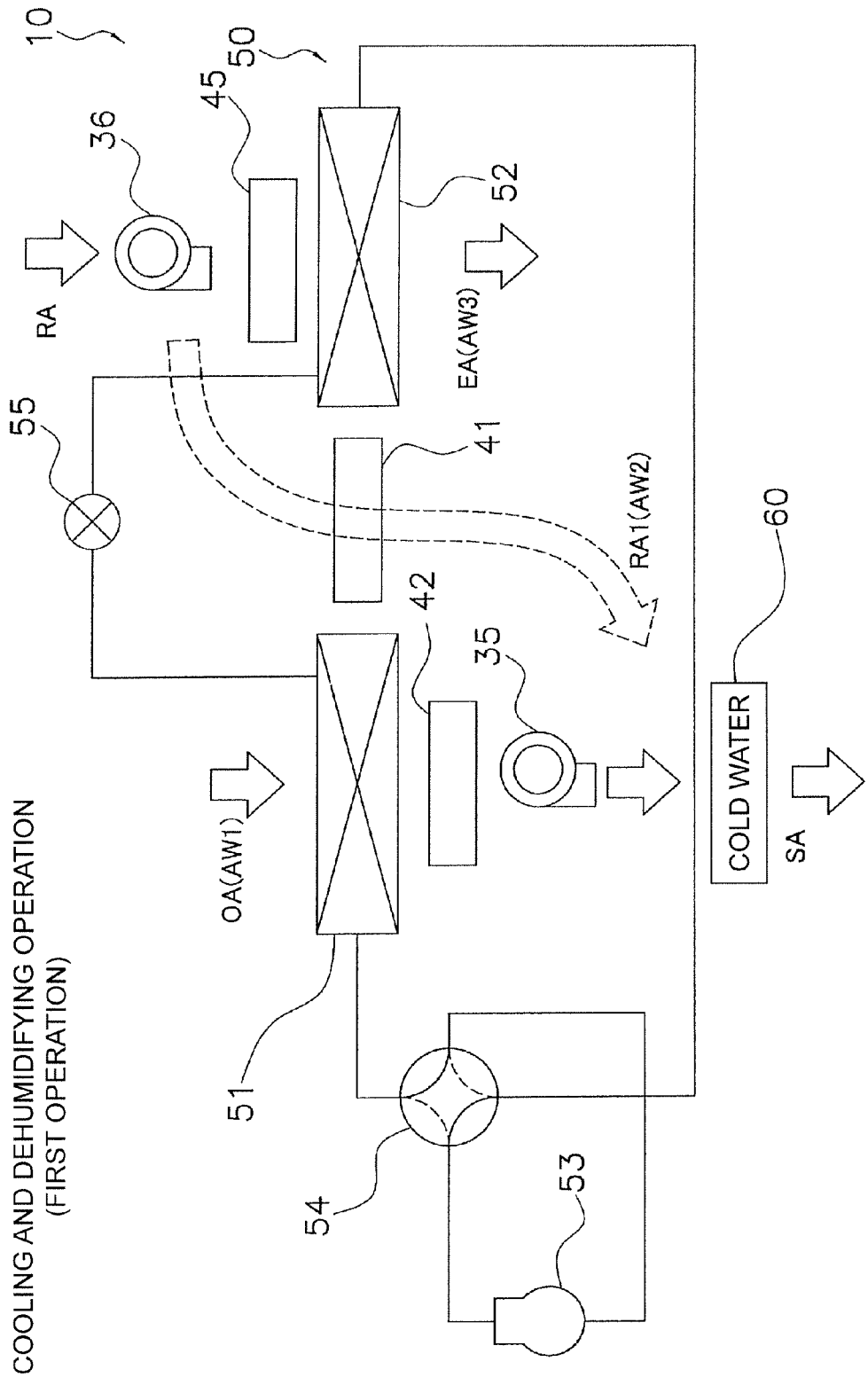
FIG. 4 is a model diagram of the air conditioner that shows the state of a refrigerant circuit and the flow of air in a first operation during cooling and dehumidifying operation.

The air conditioner 10 comprises a casing 11. In addition, a refrigerant circuit 50 is housed inside the casing 11. In the refrigerant circuit 50, a first adsorptive heat exchanger 51, a second adsorptive heat exchanger 52, a compressor 53, a four-way switching valve 54, and a motor operated expansion valve 55 are connected as shown in FIG. 4. The details of the refrigerant circuit 50 are discussed below.

In the casing 11, a front surface panel 12 is provided upright on the lower side in FIG. 1 (i.e., on the front side of the air conditioner 10) and a rear surface panel 13 is provided upright on the upper side in the same figure (i.e., on the rear side of the air conditioner 10). In addition, in the casing 11, a lower surface panel 14 is provided on the left side in FIG. 2 (i.e., on the lower side of the air conditioner 10), and an upper surface panel 15 is provided on the right side in the same figure (i.e., on the upper side of the air conditioner 10), respectively.

Two openings 21, 22, wherethrough the outdoor air OA can flow in and out (i.e., the openings 21, 22 can function as introduction ports and as exhaust ports of the outdoor air OA) are provided to the rear surface panel 13 of the casing 11 such that they are arrayed laterally. Of the two openings, the left side opening is the first indoor air outflow/outdoor air inflow port 21 and the right side opening is the second indoor air outflow/outdoor air inflow port 22.

An air supply port 23, which can supply conditioned air inside the casing 11 to the indoor space, is provided to the upper surface panel 15 of the casing 11 at a frontward position, and an indoor air introducing port 24 that can take in indoor air (i.e., that can function as a return air introducing port) is provided to the upper surface panel 15 of the casing 11 at a rearward position.

Furthermore, the internal space of the casing 11 is partitioned principally into four spaces. The four spaces have a front side space (i.e., a first space S1), an upper side space (i.e., a second space S2), a left side space (i.e., a third space S3), and a right side space (i.e., a fourth space S4). The first space S1 is the front side when the internal space of the casing 11 is divided front to back into approximately two equal parts.

The second space S2 is the upper side space when the space outside of the first space S1 is divided vertically. The third space S3 and the fourth space S4 are the left side space and the right side space when the remaining space is divided laterally, respectively.

A supply air fan 35, which supplies air conditioned air to the indoor space via the air supply port 23, and an air heat exchanger 60, which principally performs the sensible heat process on the return air RA1 and the introduced outdoor air OA, are disposed in the first space S1. The first space S1 is divided by the supply air fan 35 into an upstream space S11 and a downstream space S12.

The upstream space S11 is the space on the lower side of the supply air fan 35 in the first space S1 and is in the state wherein it is capable of communicating with other spaces (i.e., the second space S2, the third space S3, and the fourth space S4) inside the casing 11. In addition, the upstream space S11 is on the upstream side of the supply air fan 35 and is therefore continuously in a negatively pressurized state.

The downstream space S12 is the space on the upper side of the supply air fan 35 in the first space S1 and is in the state wherein it is capable of communicating with the indoor space via the air supply port 23. In addition, the downstream space S12 is on the downstream side of the supply air fan 35 and is therefore continuously in a positively pressurized state.

A return air fan 36, which is capable of introducing indoor air into the casing 11 via the indoor air introducing port 24, is disposed in the second space S2. The second space S2 is divided by the return air fan 36 into an upstream space S21 and a downstream space S22.

The upstream space S21 is the space on the upper side of the return air fan 36 in the second space S2 and is in the state wherein it is capable of communicating with the indoor space via the indoor air introducing port 24. In addition, the upstream space S21 is on the upstream side of the return air fan 36 and is therefore continuously in a negatively pressurized state.

The downstream space S22 is the space on the lower side of the return air fan 36 in the second space S2 and is in a state wherein it is capable of communicating with the third space S3 and the fourth space S4. In addition, the downstream space S22 is on the downstream side of the return air fan 36 and is therefore continuously in a positively pressurized state.

The first adsorptive heat exchanger 51, which is discussed below, is disposed in the third space S3. The third space S3 is in a state wherein it is capable of communicating with the outdoor air OA via the first indoor air outflow/outdoor air inflow port 21.

The second adsorptive heat exchanger 52, which is discussed below, is disposed in the fourth space S4. The fourth space S4 is in a state wherein it is capable of communicating with the outdoor air OA via the second indoor air outflow/outdoor air inflow port 22.

A bypass damper 41 is provided at the partition between the upstream space S11 of the first space S1 and the downstream space S22 of the second space S2. Namely, the state is of the first space S1 and the second space S2 is such that they can communicate via the bypass damper 41. Because the upstream space S11 of the first space S1 is in the negative pressure state and the downstream space S22 of the second space S2 is in the positive pressure state, air flows from the second space S2 to the first space S1 by the opening of the bypass damper 41. Namely, by opening the bypass damper 41, the indoor air RA (i.e., the return air RA1) introduced from the indoor air introducing port 24 to the second space S2 can be guided to the first space S1. Furthermore, because the bypass damper 41 is an airflow adjusting damper, the amount of the air that flows therethrough from the second space S2 to the first space S1 can be adjusted by adjusting the opening degree of a blade 41a provided to the bypass damper 41.

In addition, a first outdoor air introducing damper 42 is disposed at the partition between the upstream space S11 of the first space S1 and the third space S3. Namely, the state of the first space S1 and the third space S3 is such that they can communicate via the first outdoor air introducing damper 42. Because the upstream space S11 of the first space S1 is in the negative pressure state, if the first outdoor air introducing damper 42 is in the open state, then the outdoor air OA is introduced to the first space S1 via the first indoor air outflow/outdoor air inflow port 21 of the third space S3.

In addition, a second outdoor air introducing damper 43 is disposed at the partition between the upstream space S11 of the first space S1 and the fourth space S4. Namely, the state of the first space S1 and the fourth space S4 is such that they can communicate via the second outdoor air introducing damper 43. Because the upstream space S11 of the first space S1 is in the negative pressure state, if the second outdoor air introducing damper 43 is in the open state, then the outdoor air OA is introduced to the first space S1 via the second indoor air outflow/outdoor air inflow port 22 of the fourth space S4.

In addition, a first exhaust air damper 44 is disposed at the partition between the downstream space S22 of the second space S2 and the third space S3. Namely, the state of the second space S2 and the third space S3 is such that they can communicate via the first exhaust air damper 44. Because the downstream space S22 of the second space S2 is in the positive pressure state, if the first exhaust air damper 44 is in the open state, then the indoor air RA introduced to the second space S2 is exhausted externally via the first indoor air outflow/outdoor air inflow port 21 of the third space S3.

In addition, a second exhaust air damper 45 is disposed at the partition between the downstream space S22 of the second space S2 and the fourth space S4. Namely, the state of the second space S2 and the fourth space S4 is such that they can communicate via the second exhaust air damper 45. Because the downstream space S22 of the second space S2 is in the positive pressure state, if the second exhaust air damper 45 is in the open state, then the indoor air RA introduced to the second space S2 is exhausted externally via the second indoor air outflow/outdoor air inflow port 22 of the fourth space S4.

Furthermore, if the first outdoor air introducing damper 42 is in the open state, then the second exhaust air damper 45 is in the open state and the second outdoor air introducing damper 43 and the first exhaust air damper 44 are in the closed state (i.e., a first damper state). In addition, if the second outdoor air introducing damper 43 is in the open state, then the first exhaust air damper 44 is in the open state and the first outdoor air introducing damper 42 and the second exhaust air damper 45 are in the closed state (i.e., a second damper state). Namely, in the first damper state, the first indoor air outflow/outdoor air inflow port 21 functions as an outdoor air introducing port and the second indoor air outflow/outdoor air inflow port 22 functions as an exhaust port. In addition, in the second damper state, the first indoor air outflow/outdoor air inflow port 21 functions as an exhaust port and the second indoor air outflow/outdoor air inflow port 22 functions as an outdoor air introducing port. Furthermore, the first damper state and the second damper state are discussed below together with the refrigerant circuit 50.

As discussed above, providing the bypass damper 41 together with the supply air fan 35 and the return air fan 36 forms three air passageways inside the casing 11. Three air passageways include a first passageway AW1, a second passageway AW2 and a third passageway AW3. The first passageway AW1 is for taking the outdoor air OA into the casing 11 and delivering such to the indoor space. The second passageway AW2 is for delivering the return air RA1 to the indoor space after the indoor air RA has been taken into the casing 11. The third passageway AW3 is for delivering exhaust air EA to the outdoor space after the indoor air RA has been taken into the casing 11 (refer to the arrows in FIG. 4 and FIGS. 7-9). Accordingly, because the three air passageways are formed by the bypass damper 41 and the two fans 35, 36 and not by three fans, in the air conditioner 10, the casing 11 can be made more compact, production cost can be reduced, and energy consumption can be reduced more than the case wherein three fans are installed.

<Configuration of Refrigerant Circuit>

The refrigerant circuit 50 will now be explained, referencing FIG. 4.

The refrigerant circuit 50 is a closed circuit that is provided with the first adsorptive heat exchanger 51, the second adsorptive heat exchanger 52, the compressor 53, the four-way switching valve 54, and the motor operated expansion valve 55. The refrigerant circuit 50 performs a vapor compression refrigeration cycle by circulating a refrigerant, with which the refrigerant circuit 50 has been filled.

In the refrigerant circuit 50, a discharge side of the compressor 53 is connected to a first port of the four-way switching valve 54, and an inlet side of the compressor 53 is connected to a second port of the four-way switching valve 54. One end of the first adsorptive heat exchanger 51 is connected to a third port of the four-way switching valve 54. An other end of the first adsorptive heat exchanger 51 is connected to one end of the second adsorptive heat exchanger 52 via the motor operated expansion valve 55. An other end of the second adsorptive heat exchanger 52 is connected to a fourth port of the four-way switching valve 54.

Figure 7:
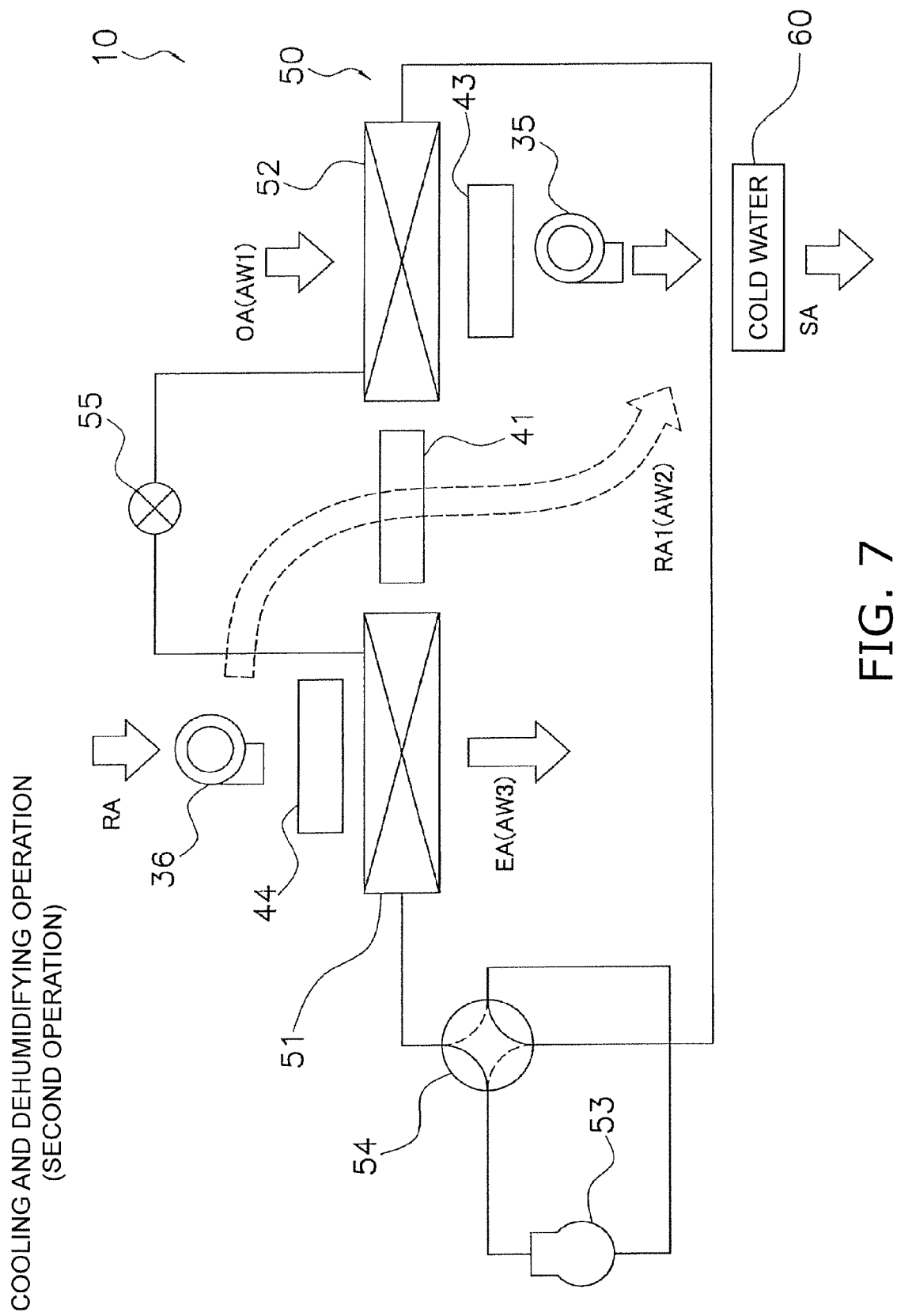
FIG. 7 is a model diagram of the air conditioner that shows the state of the refrigerant circuit and the flow of air in a second operation during cooling and dehumidifying operation.

The four-way switching valve 54 is capable of switching between: a first circuit state, wherein the first port and the fourth port communicate and the second port and the third port communicate (i.e., the state shown in FIG. 4); and a second circuit state, wherein the first port and the third port communicate and the second port and the fourth port communicate (i.e., the state shown in FIG. 7).

The first adsorptive heat exchanger 51 and the second adsorptive heat exchanger 52 both comprise a cross fin type fin-and-tube heat exchanger. The adsorptive heat exchangers 51, 52 are provided with heat transfer pipes (not shown), which are made of copper, and heat transfer fins (not shown), which are made of aluminum. Each heat transfer fin of the plurality of heat transfer fins provided to the adsorptive heat exchangers 51, 52 is formed as a rectangle plate. Furthermore, the heat transfer fins are arrayed at fixed intervals. In addition, the heat transfer pipes are provided such that they are inserted through each of the heat transfer fins.

In each of the adsorptive heat exchangers 51, 52, an adsorbing material is supported on the surface of each of the heat transfer fins, and the air that passes between the heat transfer fins contacts the adsorbing material supported by the heat transfer fins. It is possible to use as the adsorbing material a material that can adsorb water vapor in the air, for example, zeolite, silica gel, activated charcoal, or an organic polymer material that has a hydrophilic functional group. The first adsorptive heat exchanger 51 and the second adsorptive heat exchanger 52 constitute humidity conditioning members.

<Air Heat Exchanger>

Figure 5A:
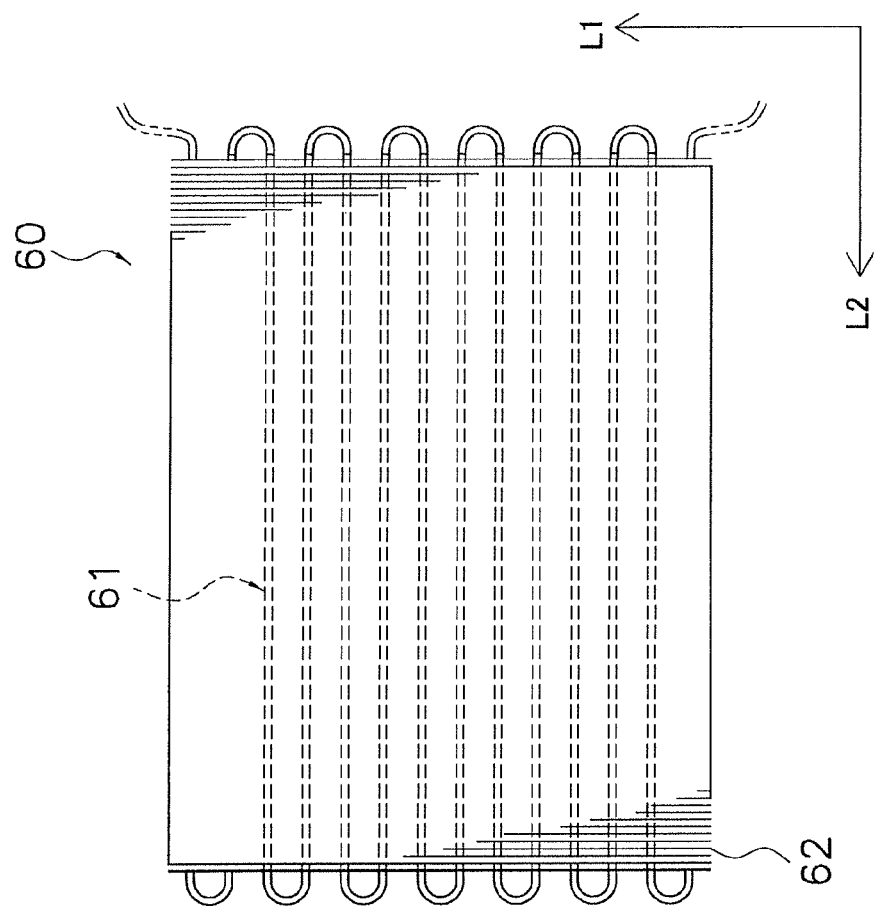
FIG. 5(a) is a top view of an air heat exchanger 60.
Figure 5B:
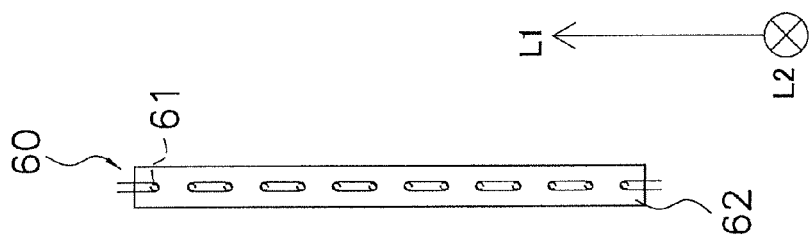
FIG. 5(b) is a side view of the air heat exchanger 60.

As shown in FIG. 5, the air heat exchanger 60 is a cross fin type fin-and-tube heat exchanger and, like the adsorptive heat exchangers 51, 52 discussed above, comprises: heat transfer pipes 61, which are made of copper; and heat transfer fins 62, which are made of aluminum. The plurality of the heat transfer pipes 61 is disposed in one row along first directions L1 in FIG. 5 and extends along second directions L2 in FIG. 5. Furthermore, the heat transfer fins 62 are each rectangular and are disposed such that their longitudinal directions follow along the first directions L1 and such that the heat transfer pipes 61 are perpendicularly inserted therethrough. As shown in FIG. 2 and FIG. 3, if cold water generated by, for example, a refrigerator and the like that is installed in and serves as a heat source in a building and the like is caused to flow inside the heat transfer pipes 61, then the air heat exchanger 60 functions as a cooler. Furthermore, if hot water generated by a boiler and the like is caused to flow inside the heat transfer pipes 61, then the air heat exchanger 60 functions as a heater. The air heat exchanger 60 is provided in the upstream space S11 of the first space S1 inside the casing 11 and is disposed such that the first directions L1 in FIG. 5 follow along the front and rear directions of the air conditioner 10 and such that the second directions L2 in FIG. 5 follow along the lateral directions of the air conditioner 10. Furthermore, the air heat exchanger 60 performs a sensible heat process on the air that flows into the first space S1.

<Configuration of Control Unit>

Figure 6:
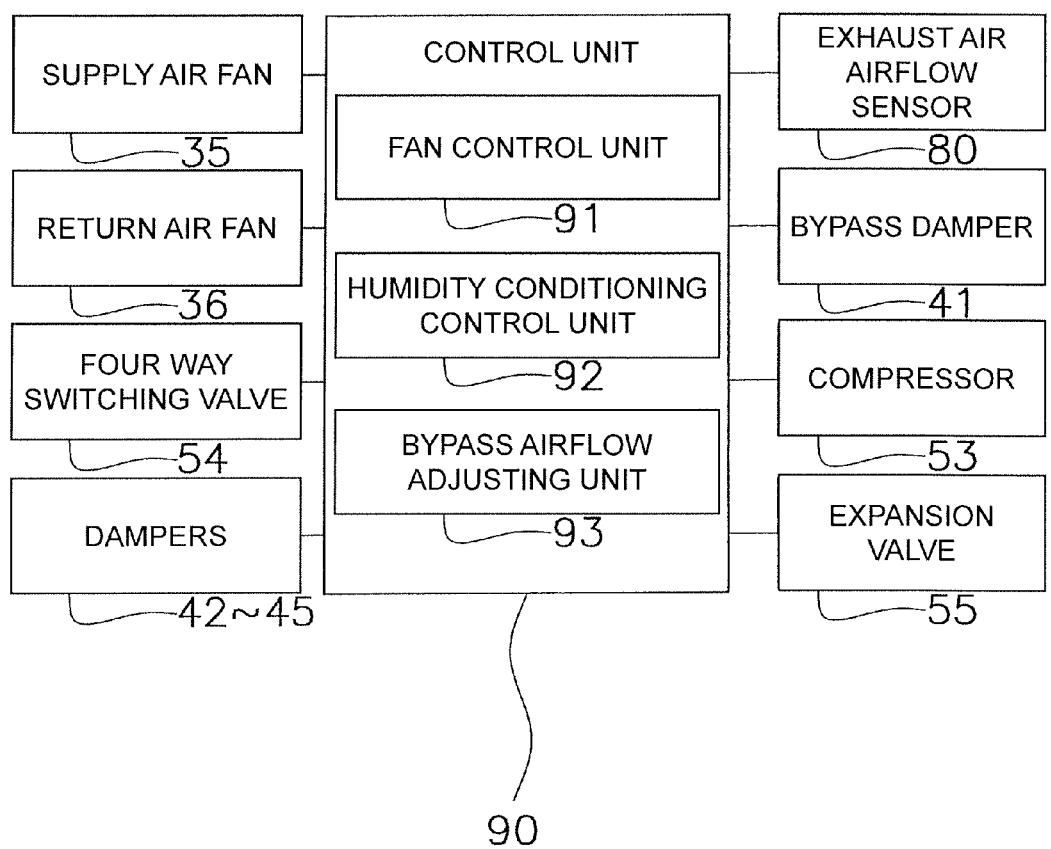
FIG. 6 is a block diagram of a control unit 90.

A control unit 90 is provided to the air conditioner 10. As shown in FIG. 6, the control unit 90 comprises a fan control unit 91, a humidity conditioning control unit 92 and a bypass airflow adjusting part 93. The fan control unit 91 controls the airflow of the supply air fan 35 and the return air fan 36. The humidity conditioning control unit 92 controls the state of the refrigeration cycle of the refrigerant circuit 50 in order to adjust the humidity conditioning capacity of the air conditioner 10. The bypass airflow adjusting part 93 adjusts the opening degree of the bypass damper 41 and the airflow of the air that flows from the second space S2 into the first space S1. Furthermore, the air conditioner 10 is provided with an exhaust air airflow sensor 80, which can detect the airflow of the air discharged to the outdoor space (i.e., the exhaust air airflow). The exhaust air airflow sensor 80 is connected to the control unit 90 via a control line. In addition, the supply air fan 35 and the return air fan 36, as well as the bypass damper 41, are also connected to the control unit 90 via control lines. Furthermore, the compressor 53, the motor operated expansion valve 55, the four-way switching valve 54, and each of the dampers 42-45 are connected to the control unit 90 via control lines, and various control functions are performed during cooling and dehumidifying operation and heating and humidifying operation, which are discussed below.

The fan control unit 91 adjusts the airflow of the supply air of the supply air fan 35 in accordance with the size of the indoor load and, linked to that airflow, adjusts the airflow of the return air RA1 of the return air fan 36 such that it equals the airflow of the indoor air RA taken in from the indoor space.

Furthermore, based on the airflow of the supply air fan 35 and the return air fan 36 being adjusted by the fan control unit 91 and the airflow of the exhaust air EA detected by the exhaust air airflow sensor 80, the bypass airflow adjusting part 93 adjusts the airflow of the outdoor air OA introduced into the casing 11 and the airflow of the exhaust air EA externally discharged from the inside of the casing 11 such that they are equal, and adjusts the ratio of the airflow of the outdoor air OA needed to secure the introduced amount of the outdoor air OA introduced to the airflow of the indoor air RA taken into the casing 11 such that it is 1:3. Furthermore, the ratio of the airflow of the outdoor air OA to the airflow of the indoor air RA that results from the bypass airflow adjusting part 93 adjusting the opening degree of the bypass damper 41 is not limited to 1:3.

—Operation—

In the air conditioner 10 of the present embodiment, the cooling and dehumidifying operation and the heating and humidifying operation are performed. During the cooling and dehumidifying operation and the heating and humidifying operation, the air conditioner 10 uses the first adsorptive heat exchanger 51 or the second adsorptive heat exchanger 52 to perform a humidity conditioning process on the outdoor air OA taken in, and uses the air heat exchanger 60 to perform the sensible heat process on mixed air, which is a mixture of the outdoor air OA after the humidity conditioning process and some of the indoor air RA taken in. Furthermore, simultaneous with the supply of air as supply air SA to the indoor space, the indoor air RA other than the indoor air RA that has been mixed with the outdoor air OA as the mixed air taken in is discharged as the exhaust air EA to the outdoor space.

<Cooling and Dehumidifying Operation>

In the air conditioner 10 during cooling and dehumidifying operation, a first operation and a second operation, which are discussed below, are performed alternately and repetitively at prescribed time intervals, for example, at three-minute intervals. At this time, the air heat exchanger 60 is in a state wherein cold water of approximately 15° C. is supplied from the heat source.

First, the first operation during cooling and dehumidifying operation will be explained. As shown in FIG. 4, during the first operation, each of the dampers 42-45 is set to the first damper state. Furthermore, in this state, the supply air fan 35 and the return air fan 36 of the air conditioner 10 are operated. When the supply air fan 35 operates, the outdoor air OA is taken in, as first air, from the first indoor air outflow/outdoor air inflow port 21 to the third space S3 inside the casing 11. When the return air fan 36 operates, the indoor air RA is taken in, as second air, from the indoor air introducing port 24 to the second space S2 inside the casing 11.

As shown in FIG. 4, in the refrigerant circuit 50 during the first operation, the four-way switching valve 54 is set to the first circuit state. In the refrigerant circuit 50 in this state, the refrigerant circulates and thereby the refrigeration cycle is performed. At this time, in the refrigerant circuit 50, the refrigerant discharged from the compressor 53 passes through, in order, the second adsorptive heat exchanger 52, the motor operated expansion valve 55, and the first adsorptive heat exchanger 51. Furthermore, the first adsorptive heat exchanger 51 becomes an evaporator and the second adsorptive heat exchanger 52 becomes a condenser.

When the first air flows from the first indoor air outflow/outdoor air inflow port 21 into the third space S3, it passes through the first adsorptive heat exchanger 51, which is functioning as an evaporator. In the first adsorptive heat exchanger 51, the adsorbing material adsorbs the moisture in the first air (i.e., the first air is dehumidified), and the heat of adsorption generated at that time is absorbed by the refrigerant. The first air dehumidified by the first adsorptive heat exchanger 51 is taken into the third space S3, passes through the first outdoor air introducing damper 42, and flows into the upstream space S11 of the first space S1.

Moreover, the airflow of the second air that flows from the indoor air introducing port 24 into the second space S2 is adjusted by the bypass damper 41, after which the second air is split into a third air, which is guided to the upstream space S11 of the first space S1, and a fourth air, which passes through the second exhaust air damper 45 and is guided to the fourth space S4.

The third air that flows into the first space S1 is mixed with the first air that likewise flows into the upstream space S11 of the first space S1, after which the third air is cooled by the air heat exchanger 60 and supplied by the supply air fan 35 to the indoor space via the air supply port 23.

The fourth air that flows into the fourth space S4 passes through the second adsorptive heat exchanger 52 and is discharged to the outdoor space via the second indoor air outflow/outdoor air inflow port 22. In the second adsorptive heat exchanger 52, moisture is desorbed from the adsorbing material, which was heated by the refrigerant, and that desorbed moisture is imparted to the fourth air. In so doing, the fourth air is discharged to the outdoor space in the state wherein the moisture has been imparted by the second adsorptive heat exchanger 52.

The second operation of the cooling and dehumidifying operation will now be explained. As shown in FIG. 7, during the second operation, each of the dampers 42-45 is set to the second damper state.

As shown in FIG. 7, in the refrigerant circuit 50 during the second operation, the four-way switching valve 54 is set to the second circuit state. In the refrigerant circuit 50 in this state, the refrigerant circulates and thereby the refrigeration cycle is performed. At this time, in the refrigerant circuit 50, the refrigerant discharged from the compressor 53 passes through, in order, the first adsorptive heat exchanger 51, the motor operated expansion valve 55, and the second adsorptive heat exchanger 52. Furthermore, the first adsorptive heat exchanger 51 becomes a condenser and the second adsorptive heat exchanger 52 becomes an evaporator.

When the first air flows from the second indoor air outflow/outdoor air inflow port 22 into the fourth space S4, it passes through the second adsorptive heat exchanger 52, which is functioning as an evaporator. In the second adsorptive heat exchanger 52, the adsorbing material adsorbs the moisture in the first air (i.e., the first air is dehumidified), and the heat of adsorption generated at that time is absorbed by the refrigerant. The first air dehumidified by the second adsorptive heat exchanger 52 is taken into the fourth space S4, passes through the second outdoor air introducing damper 43, and flows into the upstream space S11 of the first space S1.

Moreover, the airflow of the second air that flows from the indoor air introducing port 24 into the second space S2 is adjusted by the bypass damper 41, after which the second air is split into the third air, which is guided to the upstream space S11 of the first space S1, and the fourth air, which passes through the first exhaust air damper 44 and is guided to the third space S3.

The third air that flows into the first space S1 is mixed with the first air that likewise flows into the upstream space S11 of the first space S1, after which the third air is cooled by the air heat exchanger 60 and supplied by the supply air fan 35 to the indoor space via the air supply port 23.

The fourth air that flows into the third space S3 passes through the first adsorptive heat exchanger 51 and is discharged to the outdoor space via the first indoor air outflow/outdoor air inflow port 21. In the first adsorptive heat exchanger 51, moisture is desorbed from the adsorbing material, which was heated by the refrigerant, and that desorbed moisture is imparted to the fourth air. In so doing, the fourth air is discharged to the outdoor space in the state wherein the moisture has been imparted by the first adsorptive heat exchanger 51.

In the cooling and dehumidifying operation, because the first air that flowed into the first space S1 is already being dehumidified and the third air is the indoor air RA whose absolute humidity is not all that high, the mixed air of the third air and the first air cooled by the air heat exchanger 60 is in a state of low absolute humidity (i.e., a dried state). Consequently, in the air heat exchanger 60, while only the sensible heat process is performed, the latent heat process is hardly performed, and the temperature of the cold water that flows through the interior of the air heat exchanger 60 is sufficient for cooling the indoor space even if a relatively high temperature of approximately 15° C. is set (conventionally, a temperature of approximately 7° C. is often set). In addition, for the same reason, virtually no condensed water is generated in the air heat exchanger 60. Accordingly, in the air conditioner 10 of the present embodiment, there is no need for a component, such as a drain pan or a drain piping, to process the condensed water. Thereby, costs incurred in the manufacture of the air conditioner 10 can be reduced; in addition, because the drain piping is also not needed during fabrication, fabrication-related costs can also be reduced.

<Heating and Humidifying Operation>

In the air conditioner 10 during heating and humidifying operation, a first operation and a second operation, which are discussed below, are performed alternately and repetitively at prescribed time intervals, for example, at three-minute intervals. At this time, the air heat exchanger 60 is in a state wherein hot water of approximately 45° C. is supplied from the heat source.

In the air conditioner 10 during cooling and dehumidifying operation, the first operation and the second operation, which are discussed below, are performed alternately and repetitively at prescribed time intervals, for example, at three-minute intervals. At this time, the air heat exchanger 60 is in a state wherein cold water of approximately 15° C. is supplied from the heat source.

Figure 8:
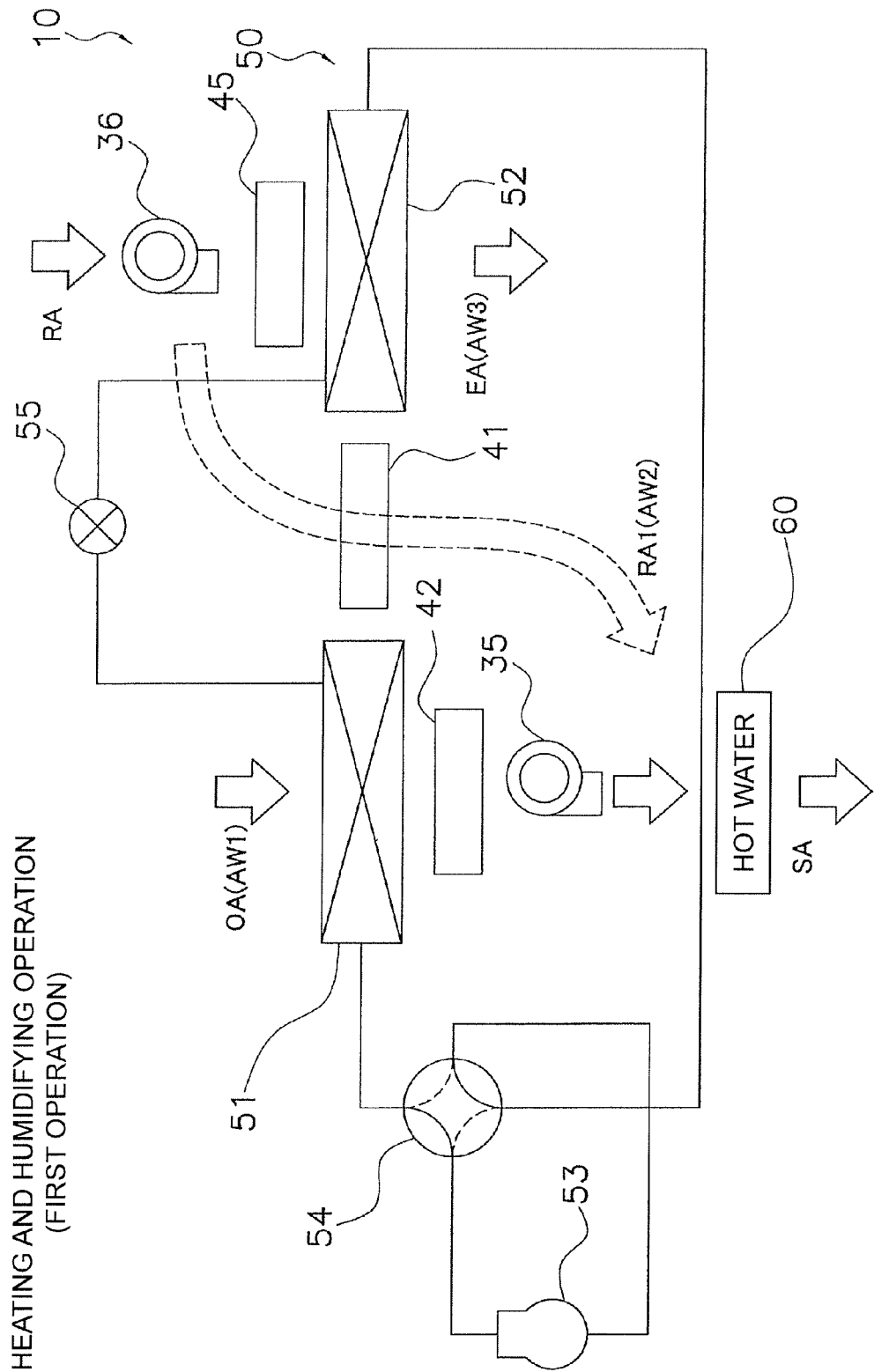
FIG. 8 is a model diagram of the air conditioner that shows the state of the refrigerant circuit and the flow of air in the first operation during heating and humidifying operation.

First, the first operation during heating and humidifying operation will be explained. As shown in FIG. 8, during the first operation, each of the dampers 42-45 is set to the first damper state. Furthermore, in this state, the supply air fan 35 and the return air fan 36 of the air conditioner 10 are operated. When the supply air fan 35 operates, the outdoor air OA is taken in, as the first air, from the first indoor air outflow/outdoor air inflow port 21 to the third space S3 inside the casing 11. When the return air fan 36 operates, the indoor air RA is taken in, as the second air, from the indoor air introducing port 24 to the second space S2 inside the casing 11.

As shown in FIG. 8, in the refrigerant circuit 50 during the first operation, the four-way switching valve 54 is set to the second circuit state. In the refrigerant circuit 50 in this state, the refrigerant circulates and thereby the refrigeration cycle is performed. At this time, in the refrigerant circuit 50, the refrigerant discharged from the compressor 53 passes through, in order, the first adsorptive heat exchanger 51, the motor operated expansion valve 55, and the second adsorptive heat exchanger 52. Furthermore, the first adsorptive heat exchanger 51 becomes a condenser and the second adsorptive heat exchanger 52 becomes an evaporator.

When the first air flows from the first indoor air outflow/outdoor air inflow port 21 into the third space S3, it passes through the first adsorptive heat exchanger 51, which is functioning as a condenser. In the first adsorptive heat exchanger 51, moisture is desorbed from the adsorbing material that was heated by the refrigerant, and this desorbed moisture is imparted to the first air (i.e., the first air is humidified). The first air humidified by the first adsorptive heat exchanger 51 is taken into the third space S3, passes through the first outdoor air introducing damper 42, and flows into the upstream space S11 of the first space S1.

Moreover, the airflow of the second air that flows from the indoor air introducing port 24 into the second space S2 is adjusted by the bypass damper 41, after which the second air is split into the third air, which is guided to the upstream space S11 of the first space S1, and the fourth air, which passes through the second exhaust air damper 45 and is guided to the fourth space S4.

The third air that flows into the first space S1 is mixed with the first air that likewise flows into the upstream space S11 of the first space S1, after which the third air is heated by the air heat exchanger 60 and supplied by the supply air fan 35 to the indoor space via the air supply port 23.

The fourth air that flows into the fourth space S4 passes through the second adsorptive heat exchanger 52 and is discharged to the outdoor space via the second indoor air outflow/outdoor air inflow port 22. In the second adsorptive heat exchanger 52, moisture in the fourth air is adsorbed by the adsorbing material, and the heat of adsorption generated at that time is absorbed by the refrigerant. In so doing, the fourth air is discharged to the outdoor space in the state wherein the moisture has been removed by the second adsorptive heat exchanger 52.

Figure 9:
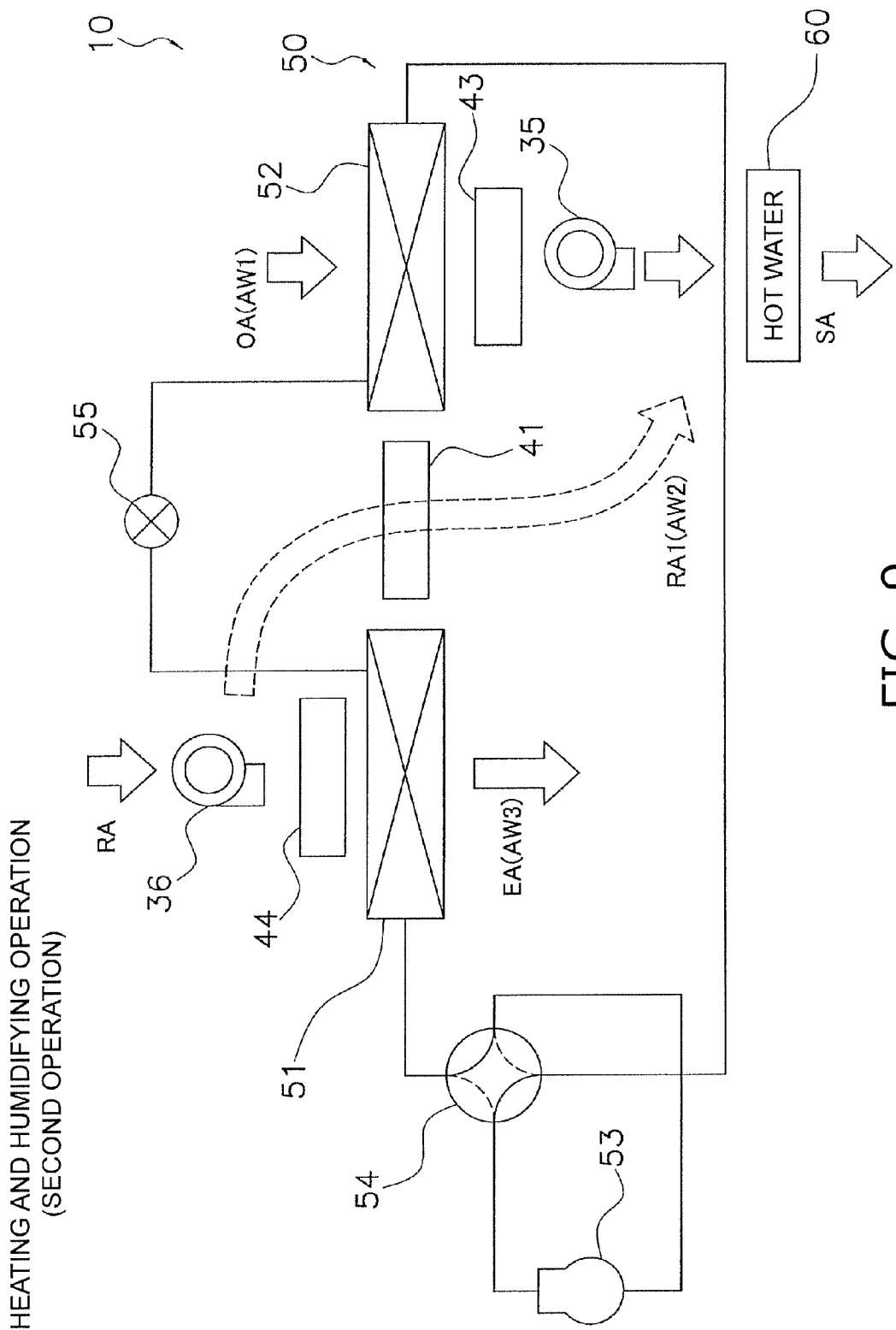
FIG. 9 is a model diagram of the air conditioner that shows the state of the refrigerant circuit and the flow of air in the second operation during heating and humidifying operation.

The second operation of the heating and humidifying operation will now be explained. As shown in FIG. 9, during the second operation, each of the dampers 42-45 is set to the second damper state. Furthermore, in this state, the supply air fan 35 and the return air fan 36 of the air conditioner 10 operate. When the supply air fan 35 operates, the outdoor air OA is taken, as the first air, from the second indoor air outflow/outdoor air inflow port 22 into the fourth space S4 inside the casing 11. When the return air fan 36 operates, the indoor air RA is taken, as the second air, from the indoor air introducing port 24 into the second space S2 inside the casing 11.

As shown in FIG. 9, in the refrigerant circuit 50 during the second operation, the four-way switching valve 54 is set to the first circuit state. In the refrigerant circuit 50 in this state, the refrigerant circulates and thereby the refrigeration cycle is performed. At this time, in the refrigerant circuit 50, the refrigerant discharged from the compressor 53 passes through, in order, the second adsorptive heat exchanger 52, the motor operated expansion valve 55, and the first adsorptive heat exchanger 51. Furthermore, the first adsorptive heat exchanger 51 becomes an evaporator and the second adsorptive heat exchanger 52 becomes a condenser.

When the first air flows from the second indoor air outflow/outdoor air inflow port 22 into the fourth space S4, it passes through the second adsorptive heat exchanger 52, which is functioning as a condenser. In the second adsorptive heat exchanger 52, moisture is desorbed from the adsorbing material that was heated by the refrigerant, and this desorbed moisture is imparted to the first air (i.e., the first air is humidified). The first air humidified by the second adsorptive heat exchanger 52 is taken into the fourth space S4, passes through the second outdoor air introducing damper 43, and flows into the upstream space S11 of the first space S1.

Moreover, the airflow of the second air that flows from the indoor air introducing port 24 into the second space S2 is adjusted by the bypass damper 41, after which the second air is split into the third air, which is guided to the upstream space S11 of the first space S1, and the fourth air, which passes through the first exhaust air damper 44 and is guided to the third space S3.

The third air that flows into the first space S1 is mixed with the first air that likewise flows into the upstream space S11 of the first space S1, after which the third air is heated by the air heat exchanger 60 and supplied by the supply air fan 35 to the indoor space via the air supply port 23.

The fourth air that flows into the third space S3 passes through the first adsorptive heat exchanger 51 and is discharged to the outdoor space via the first indoor air outflow/outdoor air inflow port 21. In the first adsorptive heat exchanger 51, moisture in the fourth air is adsorbed by the adsorbing material, and the heat of adsorption generated at that time is absorbed by the refrigerant. In so doing, the fourth air is discharged to the outdoor space in the state wherein the moisture has been removed by the first adsorptive heat exchanger 51.

In the heating and humidifying operation, the moisture in the air, which is particularly insufficient during the winter season, is taken in from the outdoor air OA, which makes it possible to perform heating while performing humidification. Consequently, both heating and humidification can be performed without supplying any water for humidification.

<Characteristics>

(1)

In the air conditioner 10 according to the present embodiment, the latent heat process and the sensible heat process are performed on the outdoor air OA and the sensible heat process is performed on the indoor air RA by virtue of the air heat exchanger 60 exchanging heat between the mixed air, which is a mixture of the outdoor air OA after the humidity conditioning process has been performed and the return air RA1 that is part of the indoor air RA, and the fluid, which has undergone a heat treatment by a heat source.

Furthermore, if cold water is caused to flow through the air heat exchanger 60 and the drainless air conditioner 10 according to the present invention is made to perform cooling and dehumidifying operation, then heat is exchanged between the cold water and the mixed air, which is a mixture of the return air RA1 and the outdoor air OA after having undergone the humidity conditioning process (i.e., the latent heat process) in the air heat exchanger 60.

Thus, when the cooling and dehumidifying operation is performed in the air conditioner 10, the heat is exchanged between the mixed air, which is a mixture of the dried outdoor air OA after it has undergone the latent heat process and the return air RA1, and the cold water. Consequently, in the air heat exchanger 60, while only the sensible heat process is performed the latent heat process is virtually not performed, which makes it possible to sufficiently cool the indoor space even if the temperature of the cold water that is caused to flow through the interior of the air heat exchanger 60 is set to, for example, 15° C., which is a high temperature compared with that of the conventional temperature of 7° C. Accordingly, the temperature of the cold water generated by the refrigerator and the like can be set high, which makes it possible to reduce energy consumption. In addition, for the same reason, it is possible to prevent the generation of condensed water in the air heat exchanger 60. Accordingly, in the air conditioner 10, there is no need for a component, such as a drain pan or a drain piping, to process the condensed water. Thereby, costs incurred in the manufacture of the drainless air conditioner 10 can be reduced. In addition, because the drain piping is also not needed during fabrication, fabrication-related costs can also be reduced.

(2)

In the air conditioner 10 according to the present embodiment, the humidity conditioning process is performed on the outdoor air OA in advance such that the air heat exchanger 60 tends not to generate condensed water. Consequently, the air heat exchanger 60 is disposed such that the directions in which the heat transfer pipes 61 extend and the row directions in which the plurality of the heat transfer pipes 61 is arrayed are oriented in the horizontal directions.

Generally, if air is cooled by an air heat exchanger (particularly in the summer season), then condensed water tends to be generated and, therefore, in order make it easy to process this condensed water, the air heat exchanger is often disposed such that the row directions in which the plurality of the heat transfer pipes is arrayed are either oriented in the vertical directions or intersect the horizontal directions. However, in the air conditioner 10, virtually no condensed water is generated, which makes it possible to dispose the air heat exchanger 60 such that the directions in which the heat transfer pipes 61 extend and the row directions in which the plurality of the heat transfer pipes 61 is arrayed are oriented in the horizontal directions. Accordingly, there is no limit to how the air heat exchanger 60 can be arranged, which makes it easy to design the product compactly compared with the case wherein the degrees of freedom in the arrangement of the air heat exchanger are limited.

(3)

In the air conditioner 10 according to the present embodiment, the casing 11 has: the first indoor air outflow/outdoor air inflow port 21 and the second indoor air outflow/outdoor air inflow port 22, which can introduced the outdoor air OA to the casing 11 and can discharge the exhaust air EA to the outdoor space; the indoor air introducing port 24, which can introduce the indoor air RA; and the air supply port 23, which can supply the air conditioned mixed air to the indoor space. The first indoor air outflow/outdoor air inflow port 21 and the second indoor air outflow/outdoor air inflow port 22 bring the interior of the casing 11 and the outdoor space into communication with one another. The indoor air introducing port 24 and the air supply port 23 bring the interior of the casing 11 and the indoor space into communication with one another.

Thus, providing the four openings 21-24 to the casing 11 makes it possible for the four openings 21-24 to exclusively distribute the four types of air currents, namely, the outdoor air OA, the indoor air RA, the exhaust air EA, and the supply air SA (i.e., the air conditioned mixed air). Accordingly, the indoor space can be ventilated smoothly.

(4)

In the air conditioner 10 according to the present embodiment, there are three air passageways inside the casing 11: the first passageway AW1, which is for taking the outdoor air OA into the casing 11 and then delivering such to the indoor space; the second passageway AW2, which is for delivering the return air RA1 to the indoor space after the indoor air RA has been taken into the casing 11; and the third passageway AW3, which is for delivering the exhaust air EA to the outdoor space after the indoor air RA has been taken into the casing 11. Furthermore, these three passageways are formed by the supply air fan 35, the return air fan 36, and the bypass damper 41, respectively.

Thus, three air passageways are formed by the bypass damper 41 and the two fans 35, 36 and not by three fans to form three air passageways. Consequently, in the air conditioner 10, the casing 11 can be made more compact than the case wherein three fans are installed. In addition, in the air conditioner 10, production cost can be reduced more than the case wherein three fans are installed. Furthermore, in the air conditioner 10, energy consumption can be reduced more than the case wherein three fans are installed.

An outdoor air supplying unit is formed of the port 21/22, the space S3, the damper 42/43, the space S1, the supply air fan 35 and the air supply port 23, which are arranged to supply the outdoor air OA into the main body casing 11 and to deliver the outdoor air OA to an indoor space. An indoor air supplying unit is formed of the air supply port 23, the return air fan 36, the space S2, the damper 41, space S1, the supply air fan 35 and the air supply port 23, which are arranged to supply return air RA1 to the indoor space, the return air RA1 being some of the indoor air RA taken into the main body casing 11. An exhausting unit is formed of the air supply port 23, the return air fan 36, the space S2, the damper 44/45, space S3, and the port 21/22, which are arranged to supply exhaust air EA to an outdoor space, the exhaust air EA being the indoor air other than the return air RA1 that was taken into the main body casing 11. Thus certain parts are part of more than one of the outdoor air supplying unit, the indoor air supplying unit, and the exhausting unit.

Modified Examples

1

Figure 10:
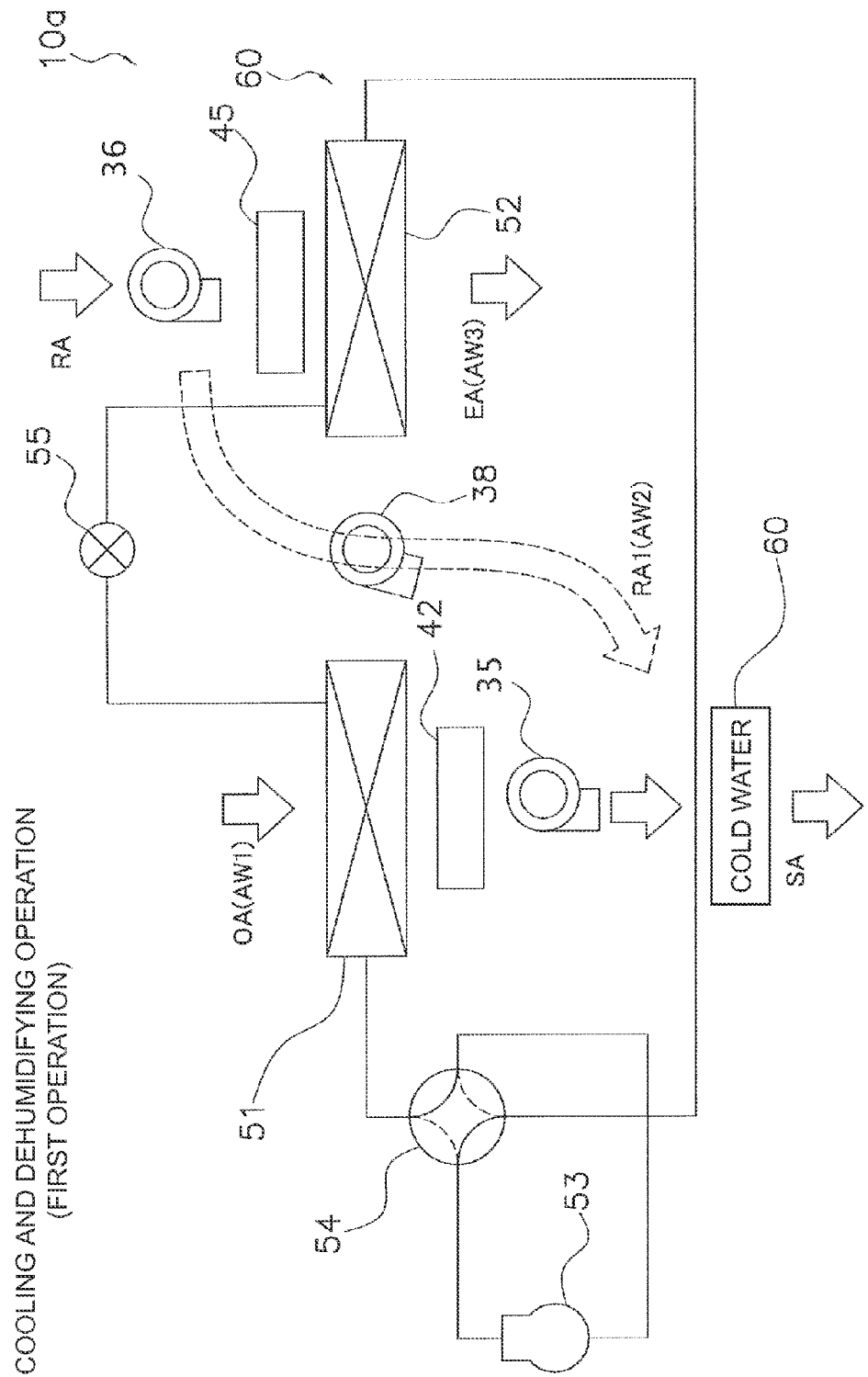
FIG. 10 is a model diagram of the air conditioner that shows the state of the refrigerant circuit and the flow of air in the first operation during cooling and dehumidifying operation according to a modified example (1).

In the air conditioner 10 according to the abovementioned embodiment, the bypass damper 41, the supply air fan 35 and the return air fan 36 are used to form the three air passageways AW1-AW3, but the present invention is not limited thereto. For example, the three passageways AW1-AW3 may be formed by providing three fans, namely, the supply air fan 35 that forms the first passageway AW1, the return air fan 36 that forms the third passageway AW3, and an additional return air fan 38 (disposed in place of the damper 41 in the preceding Figures) that forms the second passageway AW2 (refer to FIG. 10). Furthermore, in such a case, an adjustment is made by controlling the rotational speeds of the additional return air fan 38 and the return air fan 36 such that the ratio of the airflow of the return air RA1 to the airflow of the exhaust air EA is, for example, 3:1. FIG. 10 is a model diagram of an air conditioner 10a that shows the state of the refrigerant circuit and the flow of air in the first operation of cooling and dehumidifying operation. The return air fan 36 can also be considered an exhaust air fan since the return air fan 36 also operates to exhaust air. Furthermore, in this embodiment, the additional return air fan 38 located in place of the damper 41 forms art of a modified indoor air supplying unit described in the preceding embodiment.

2

In the air conditioner 10 according to the abovementioned embodiment, cooling and heating is performed by causing cold and hot water to flow through the air heat exchanger 60, but what flows through the air heat exchanger 60 is not limited to cold and hot water, and may be brine and the like.

INDUSTRIAL APPLICABILITY

The drainless air conditioner according to the present invention achieves effects wherein energy consumption can be reduced and fabrication is easily facilitated, and therefore is useful as a drainless air conditioner that air conditions indoor air while performing an air conditioning process on outdoor air.

What is claimed is:

1. A drainless air conditioner configured to perform an air conditioning process on a mixed air, which is a mixture of some of the mixed indoor air and additional outdoor air, the drainless air conditioner comprising:
a main body casing including
first and second outdoor ports, each of the first and second outdoor ports being arranged to selectively introduce outdoor air and discharge exhaust air,
an indoor air introducing port arranged to introduce the indoor air into the main body casing, and
an air supply port arranged to supply the mixed air from the main body casing to the indoor space;
an outdoor air supplying unit arranged to supply the outdoor air into the main body casing and to deliver the outdoor air to an indoor space;
an indoor air supplying unit arranged to supply return air to the indoor space, the return air being some of the mixed indoor air taken into the main body casing;
an exhausting unit arranged to supply exhaust air to an outdoor space, the exhaust air being the indoor air other than the return air that was taken into the main body casing;
a first adsorptive heat exchanger having an adsorbing material that can adsorb and desorb moisture in air, the first adsorptive heat exchanger functioning
as an adsorber that adsorbs the moisture or
as a regenerator that restores the adsorbed moisture to the air and that is capable of performing a humidity conditioning process on air;
a second adsorptive heat exchanger having an adsorbing material that can adsorb and desorb moisture in the air, the second adsorptive heat exchanger functioning
as an adsorber that adsorbs the moisture or
as a regenerator that restores the adsorbed moisture to the air and that is capable of performing a humidity conditioning process on air; and
an air heat exchanger arranged to exchange heat between air and a fluid after the fluid has undergone a heat treatment by a heat source,
the main body casing housing the first adsorptive heat exchanger, the second adsorptive heat exchanger, the air heat exchanger, the outdoor air supplying unit, the indoor air supplying unit, and the exhausting unit,
additional outdoor air undergoing a humidity conditioning process by the first adsorptive heat exchanger or the second adsorptive heat exchanger and becoming mixed air together with some of the mixed indoor air mixed therewith; the air heat exchanger exchanging heat between the mixed air and the fluid;
the exhaust air undergoing the humidity conditioning process by the first adsorptive heat exchanger or the second adsorptive heat exchanger and being subsequently delivered to the outdoor space, and
the drainless air conditioner being operable in
a first cooling operation in which the second adsorptive heat exchanger functioning as a regenerator and the second outdoor port functions as an exhaust port when the first adsorptive heat exchanger functions as an adsorber and the first outdoor port functions as an outdoor air introducing port, and
a second cooling operation in which the second adsorptive heat exchanger functioning as an adsorber and the second outdoor port functions as an outdoor air introducing port when the first adsorptive heat exchanger functions as a regenerator and the first outdoor port functions as an exhaust port,
the indoor air flowing into the main body casing through the indoor air introducing port in both the first cooling operation state and the second cooling operation state, and
the mixed air flowing from the main body casing through the air supply port to the indoor space in both the first cooling operation state and the second cooling operation state.

2. The drainless air conditioner according to claim 1, wherein
the air heat exchanger includes
a plurality of heat transfer pipes arrayed in at least one row and arranged to have the fluid flow therethrough, and
a plurality of heat transfer fins with the plurality of heat transfer pipes inserted therethrough; and
the air heat exchanger is disposed such that directions in which the heat transfer pipes extend and row directions in which the plurality of the heat transfer pipes are arrayed are oriented in horizontal directions.

3. The drainless air conditioner according to claim 1, further comprising:
an airflow splitting unit arranged to divide the indoor air such that airflow of the return air and airflow of the exhaust air are in a prescribed ratio;
a supply air fan arranged
to blow mixed return air and the additional outdoor air into the main body casing as the mixed air, and
to supply the mixed air, after the air heat exchanger has exchanged heat between the mixed air and the fluid, to the indoor space while
blowing the mixed return air and the additional outdoor air into the main body casing as the mixed air, and
a return air fan arranged
to blow the indoor air into the main body casing and,
to deliver the indoor air to the airflow splitting unit while blowing the indoor air into the main body casing,
the outdoor air supplying unit being arranged such that the supply air fan delivers the outdoor air from the main body casing to the indoor space after the outdoor air has been taken into the main body casing,
the indoor air supplying unit being arranged such that the supply air fan delivers the return air to the indoor space after the return air fan has taken the mixed indoor air into the main body casing, and
the exhausting unit being arranged such that the return air fan delivers the exhaust air to the outdoor space after the indoor air has been taken into the main body casing.

4. The drainless air conditioner according to claim 3, further comprising:
an exhaust air airflow detecting unit arranged to detect the airflow of the exhaust air,
the airflow splitting unit making an adjustment based on detected airflow of the exhaust air and rotational speed of the return air fan such that the ratio of the airflow of the return air to the airflow of the exhaust air is the prescribed ratio.

5. The drain less air conditioner according to claim 3, wherein
the airflow unit is an airflow adjusting damper.

6. The drainless air conditioner according to claim 1, further comprising:
a supply air fan forming part of the outdoor air supplying unit and delivering the additional outdoor air to the indoor space after the additional outdoor air has been taken into the main body casing;
a return air fan forming part of the indoor air supplying unit and delivering the mixed return air to the indoor space after the mixed return air has been taken into the main body casing; and
an exhaust fan forming part of the exhausting unit and delivering the indoor air other than the return air to the outdoor space after the indoor air other than the return air has been taken into the main body casing, an airflow ratio of the return air to the exhaust air is set to a prescribed ratio by adjusting rotational speed of the return air fan and rotational speed of the exhaust fan.

7. The drainless air conditioner according to claim 1, further comprising:
a compressor arranged to compress a refrigerant; and
an expansion mechanism arranged to reduce pressure of the refrigerant after being condensed by the first adsorptive heat exchanger or the second adsorptive heat exchanger,
the compressor, the first adsorptive heat exchanger, the expansion mechanism, and the second adsorptive heat exchanger forming a refrigerant circuit, which performs a vapor compression type cycle, and
the first adsorptive heat exchanger or the second adsorptive heat exchanger functioning as an evaporator also functioning as the adsorber, and the first adsorptive heat exchanger or the second adsorptive heat exchanger functioning as a condenser also functioning as the regenerator.

8. The drainless air conditioner according to claim 7, wherein
the refrigerant circuit further has a switching mechanism that is switchable between
a first state in which the first adsorptive heat exchanger is caused to function as an evaporator and the second adsorptive heat exchanger is caused to function as a condenser, and
a second state in which the first adsorptive heat exchanger is caused to function as a condenser and the second adsorptive heat exchanger is caused to function as an evaporator; and
the switching mechanism periodically switches between the first state and the second state.

9. The drainless air conditioner according to claim 2, further comprising:
an airflow splitting unit arranged to divide the indoor air such that airflow of the return air and airflow of the exhaust air are in a prescribed ratio;
a supply air fan arranged
to blow the mixed return air and the additional outdoor air into the main body casing as the mixed air, and
to supply the mixed air, after the air heat exchanger has exchanged heat between the mixed air and the fluid, to the indoor space while
blowing the mixed return air and the additional outdoor air into the main body casing as the mixed air, and
a return air fan arranged
to blow the indoor air into the main body casing and,
to deliver the indoor air to the airflow splitting unit while blowing the indoor air into the main body casing,
the outdoor air supplying unit being arranged such that the supply air fan delivers the outdoor air from the main body casing to the indoor space after the outdoor air has been taken into the main body casing,
the indoor air supplying unit being arranged such that the supply air fan delivers the return air to the indoor space after the return air fan has taken the mixed indoor air into the main body casing, and
the exhausting unit being arranged such that the return air fan delivers the exhaust air to the outdoor space after the indoor air has been taken into the main body casing.

10. The drainless air conditioner according to claim 9, further comprising:
an exhaust air airflow detecting unit arranged to detect the airflow of the exhaust air, the airflow splitting unit making an adjustment based on detected airflow of the exhaust air and rotational speed of the return air fan such that the ratio of the airflow of the return air to the airflow of the exhaust air is the prescribed ratio.

11. The drainless air conditioner according ing to claim 10, wherein the airflow splitting unit is an airflow adjusting damper.

12. The drainless air conditioner according to claim 2, further comprising:

a supply air fan forming part of the outdoor air supplying unit and delivering the additional outdoor air to the indoor space after the additional outdoor air has been taken into the main body casing;

a return air fan forming part of the indoor air supplying unit and delivering the mixed return air to the indoor space after the mixed return air has been taken into the main body casing; and an exhaust fan forming part of the exhausting unit and delivering the indoor air other than the return air to the outdoor space after the indoor air other than the return air has been taken into the main body casing, an airflow ratio of the return air to the exhaust air is set to a prescribed ratio by adjusting rotational speed of the return air fan and rotational speed of the exhaust fan.

13. The drainless air conditioner according to claim 2, further comprising:

a compressor arranged to compress a refrigerant; and an expansion mechanism arranged to reduce pressure of the refrigerant after being condensed by the first adsorptive heat exchanger or the second adsorptive heat exchanger, the compressor, the first adsorptive heat exchanger, the expansion mechanism, and the second adsorptive heat exchanger forming a refrigerant circuit, which performs a vapor compression type cycle, and the first adsorptive heat exchanger or the second adsorptive heat exchanger functioning as an evaporator also functioning as the adsorber, and the first adsorptive heat exchanger or the second adsorptive heat exchanger functioning as a condenser also functioning as the regenerator.

14. The drainless air conditioner according to claim 13, wherein the refrigerant circuit further has a switching mechanism that is switchable between a first state in which the first adsorptive heat exchanger is caused to function as an evaporator and the second adsorptive heat exchanger is caused to function as a condenser, and a second state in which the first adsorptive heat exchanger is caused to function as a condenser and the second adsorptive heat exchanger is caused to function as an evaporator; and the switching mechanism periodically switches between the first state and the second state.

15. The drainless air conditioner according to claim 3, wherein the return air fan is disposed upstream of the airflow splitting unit and downstream of the indoor air introducing port.

* * * * *